United States Patent
Yasuda et al.

(10) Patent No.: US 9,390,701 B2
(45) Date of Patent: Jul. 12, 2016

(54) ACTIVE VIBRATION OR NOISE SUPPRESSION SYSTEM

(71) Applicant: TOKAI RUBBER INDUSTRIES, LTD., Aichi (JP)

(72) Inventors: Takayoshi Yasuda, Kitanagoya (JP); Hiroyuki Ichikawa, Kani (JP); Katsuhiro Goto, Komaki (JP)

(73) Assignee: SUMITOMO RIKO COMPANY LIMITED, Aichi (JP)

( * ) Notice: Subject to any disclaimer, the term of this patent is extended or adjusted under 35 U.S.C. 154(b) by 406 days.

(21) Appl. No.: 13/857,560

(22) Filed: Apr. 5, 2013

(65) Prior Publication Data

US 2013/0259252 A1 Oct. 3, 2013

Related U.S. Application Data

(63) Continuation of application No. PCT/JP2012/065988, filed on Jun. 22, 2012.

(30) Foreign Application Priority Data

| Jun. 28, 2011 | (JP) | 2011-143427 |
| Jun. 28, 2011 | (JP) | 2011-143442 |
| Jun. 28, 2011 | (JP) | 2011-143445 |

(51) Int. Cl.

| *G10K 11/16* | (2006.01) |
| *F16F 15/00* | (2006.01) |
| *G10K 11/178* | (2006.01) |

(52) U.S. Cl.
CPC .............. *G10K 11/16* (2013.01); *F16F 15/002* (2013.01); *G10K 11/178* (2013.01); *G10K 11/1784* (2013.01); *G10K 2210/3053* (2013.01); *G10K 2210/3056* (2013.01)

(58) Field of Classification Search
None
See application file for complete search history.

(56) References Cited

U.S. PATENT DOCUMENTS

| 5,022,082 A * | 6/1991 | Eriksson et al. ............ 381/71.8 |
| 6,256,545 B1 | 7/2001 | Kimura et al. |

(Continued)

FOREIGN PATENT DOCUMENTS

| DE | 196 32 230 | 2/1998 |
| DE | 10 2005 007 6 | 10/2005 |

(Continued)

OTHER PUBLICATIONS

Nagasawa et al. JPO translation of JP 2000-181504: "Method for Adaptively Controlling Periodic Signal" published Jun. 30, 2000. pp. 1-20.*

(Continued)

*Primary Examiner* — Curtis Kuntz
*Assistant Examiner* — Qin Zhu
(74) *Attorney, Agent, or Firm* — Greenblum & Bernstein, P.L.C.

(57) ABSTRACT

An active vibration or noise suppression system is provided that achieves fast convergence of vibration or noise. A sine wave control signal $y_{(n)}$ is constituted by frequency of a vibration or noise source, and an amplitude filter coefficient $a_{(n)}$ and a phase filter coefficient $\phi_{(n)}$ as an adaptive filter coefficient. The sine wave control signal $y_{(n)}$ is expressed by a sine wave having an amplitude component and a phase component, and each of an amplitude update term $\Delta a_{(n+1)}$ and a phase update term $\Delta \phi_{(n+1)}$ includes a sine wave or cosine wave term having an amplitude component and a phase component. The phase component of the sine wave control signal $y_{(n)}$ is multiplied by a coefficient other than 1, or the phase component of the sine wave or cosine wave term of each of the amplitude update term $\Delta a_{(n+1)}$ and the phase update term $\Delta \phi_{(n+1)}$ is multiplied by a coefficient other than 1.

21 Claims, 8 Drawing Sheets

(56) References Cited

U.S. PATENT DOCUMENTS

| | | | |
|---|---|---|---|
| 7,706,924 | B2 | 4/2010 | Ichikawa et al. |
| 2005/0187692 | A1 | 8/2005 | Ichikawa et al. |
| 2005/0228574 | A1* | 10/2005 | Ichikawa et al. .............. 701/111 |

FOREIGN PATENT DOCUMENTS

| | | |
|---|---|---|
| DE | 698 26 765 | 3/2006 |
| JP | 05-061483 | 3/1993 |
| JP | 06-274179 | 9/1994 |
| JP | 08-044377 | 2/1996 |
| JP | 08-272378 | 10/1996 |
| JP | 09-282007 | 10/1997 |
| JP | 10-124108 | 5/1998 |
| JP | 10-177076 | 6/1998 |
| JP | 2000-181504 | 6/2000 |
| JP | 2005-234948 | 9/2005 |

OTHER PUBLICATIONS

Goto et al. JPO translation of JP 10-124108: "Adaptive Control Method for Cyclic Signal" published May 15, 1998. pp. 1-12.*
Japan Notification of Reasons for Refusal, dated May 7, 2015, by the Japan Patent Office in the corresponding Japanese Patent Application No. 2011-143445 (including partial English language translation).
International Search Report, mailed Sep. 18, 2012, for International Application No. PCT/JP2012/065998.
Examiner's First Official Letter (including English language translation thereof), dated Mar. 1, 2016, in corresponding German Patent Application No. 11 2012 001 573.8.

* cited by examiner

ACTIVE VIBRATION OR NOISE SUPPRESSION SYSTEM

CROSS-REFERENCE TO RELATED APPLICATION

This is a continuation of Application PCT/JP2012/065988, filed on Jun. 22, 2012, which is incorporated herein by reference. The present invention is based on Japanese Patent Application No. 2011-143427, filed on Jun. 28, 2011, No. 2011-143442, filed on Jun. 28, 2011, No. 2011-143445, filed on Jun. 28, 2011, the entire contents of which are incorporated herein by reference.

BACKGROUND OF THE INVENTION

1. Field of the Invention

The present invention relates to an active vibration or noise suppression system capable of actively suppressing vibration or noise by using adaptive control.

2. Description of the Related Art

Japanese Unexamined Patent Publication Nos. H08-44377, H08-272378, and H05-61483 describe some conventional systems for actively suppressing vibration or noise by using adaptive control. These documents describe control methods using LMS algorithms as adaptive control algorithms. In particular, Japanese Unexamined Patent Publication Nos. H08-44377 and H08-272378 describe delayed-x harmonics synthesizer (DXHS) algorithms of filtered-x LMS algorithms.

SUMMARY OF THE INVENTION

It is an object of the present invention to provide an active vibration or noise suppression system capable of converging vibration or noise more quickly.

(1) Active Vibration Noise Suppression System According to First Means

An active vibration or noise suppression system according to a first means is an active vibration or noise suppression system for actively suppressing vibration or noise at an evaluation point by outputting control vibration or control sound, wherein the active vibration or noise suppression system comprises: a control signal generating unit for generating a sine wave control signal $y_{(n)}$ constituted by frequency of a vibration or noise source, and an amplitude filter coefficient and a phase filter coefficient as an adaptive filter coefficient; a control vibration or control sound generator for outputting the control vibration or control sound corresponding to the sine wave control signal $y_{(n)}$; a residual error signal detecting unit for detecting, at the evaluation point, a residual error signal $e_{(n)}$ generated by interference between vibration or noise caused by the vibration or noise source and the control vibration or control sound; an amplitude filter coefficient updating unit for calculating an amplitude update term $\Delta a_{(n+1)}$ to be added to or subtracted from a last updated value of the amplitude filter coefficient $a_{(n)}$ for update, so as to reduce the residual error signal $e_{(n)}$; and a phase filter coefficient updating unit for calculating a phase update term $\Delta \phi_{(n+1)}$ to be added to or subtracted from a last updated value of the phase filter coefficient $\phi_{(n)}$ for update, so as to reduce the residual error signal $e_{(n)}$.

The sine wave control signal $y_{(n)}$ is expressed by a sine wave having an amplitude component and a phase component. Each of the amplitude update term $\Delta a_{(n+1)}$ and the phase update term $\Delta \phi_{(n+1)}$ contains a sine wave or cosine wave term having an amplitude component and a phase component. The phase component of the sine wave control signal $y_{(n)}$ is expressed by multiplying a coefficient other than 1 by the phase filter coefficient $\phi_{(n)}$, or the phase component of the sine wave or cosine wave term of each of the amplitude update term $\Delta a_{(n+1)}$ and the phase update term $\Delta \phi_{(n+1)}$ is expressed by multiplying a coefficient other than 1 by the phase filter coefficient $\phi_{(n)}$.

According to the present means, a phase of the control vibration or control sound can be converged at the evaluation point so as to be opposite to a phase of transmitted vibration or noise from the vibration or noise source quickly. The vibration or noise itself at the evaluation point can be converged quickly.

Hereinafter, (First Specific Embodiment), (Second Specific Embodiment), and (Third Specific Embodiment) will be described as specific embodiments of the active vibration or noise suppression system according to the first means.

First Specific Embodiment of First Means

Additionally, the phase component of the sine wave control signal $y_{(n)}$ can be expressed by multiplying a value greater than 1 by the phase filter coefficient $\phi_{(n)}$.

Thus used in the phase component of the sine wave control signal $y_{(n)}$ is not a value of the phase filter coefficient $\phi_{(n)}$ updated by the phase filter coefficient updating unit as it is but a value obtained by multiplying the phase filter coefficient $\phi_{(n)}$ by a value greater than 1. That is to say, used is a value which is proportional to the updated value of the phase filter coefficient $\phi_{(n)}$. Owing to this, the phase of the control vibration or control sound can be converged at the evaluation point so as to be opposite to the phase of transmitted vibration or noise from the vibration or noise source quickly. As a result, the vibration or noise itself at the evaluation point can be converged quickly.

Moreover, the sine wave control signal $y_{(n)}$ can be expressed by Equation (1). This enables the abovementioned advantageous effect to be reliably exhibited.

[Math. 1]

$$y_{(n)} = a_{(n)} \cdot \sin(\omega \cdot t_{(n)} + q \cdot \phi_{(n)}) \quad (1)$$

wherein:
$y_{(n)}$: sine wave control signal
$a_{(n)}$: amplitude filter coefficient
$\phi_{(n)}$: phase filter coefficient
$\omega$: angular frequency
$q$: phase multiplier coefficient ($q > 1$)
$t_{(n)}$: sampling time
$(n)$: the number of samples (time step)

Moreover, the sine wave or cosine wave term of the amplitude update term $\Delta a_{(n+1)}$ can be a term in Expression (2) and the sine wave or cosine wave term of the phase update term $\Delta \phi_{(n+1)}$ can be a term in Expression (3).

[Math. 2]

$$a1 \cdot e_{(n)} \cdot \sin\left(\omega \cdot t_{(n)} + \frac{\phi_{(n)}}{m} + \phi 1\right) \quad (2)$$

wherein:
$e_{(n)}$: residual error signal
$a1$: amplitude coefficient
$\phi 1$: phase coefficient
$m$: stability coefficient ($m \geq 1$)

[Math. 3]

$$a2 \cdot e_{(n)} \cdot \cos\left(\omega \cdot t_{(n)} + \frac{\phi_{(n)}}{m} + \phi 2\right) \quad (3)$$

wherein:
  a2: amplitude coefficient
  φ2: phase coefficient

In addition to the abovementioned advantageous effect, that is to say, fast convergence of the vibration or noise itself at the evaluation point, this enables the following advantageous effect to be exhibited. That is to say, when the sine wave control signal $y_{(n)}$ is transmitted to the evaluation point through a transfer function G, whatever phase the control vibration or control sound has with respect to that of the vibration or noise transmitted from the source of vibration to the evaluation point, eventually control can be converged without being diverged. It is to be noted that the stability coefficient m can be 1 or a value greater than 1.

Then, the amplitude coefficient a1 and the phase coefficient φ1 in Expression (2) and the amplitude coefficient a2 and the phase coefficient φ2 in Expression (3) can be coefficients which are independent of a transfer function G between the control signal generating unit and the evaluation point. Even if these coefficients as the phase components of periodic functions in the amplitude update term $\Delta a_{(n+1)}$ and the phase update term $\Delta\phi_{(n+1)}$ are values which are independent of the transfer function G, eventually control can be converged. Accordingly, there is no need to identify the transfer function G and there is no need to pursue accuracy in identification. Therefore, arithmetic processing can be simplified and load of arithmetic processing can be reduced.

Here, when the amplitude coefficient a2 and the phase coefficient φ2 are coefficients which are independent of the transfer function G, it is preferred that Expression (2) is Expression (4), and Expression (3) is Expression (5). This allows reliable convergence of control.

[Math. 4]

$$\mu_{a2} \cdot e_{(n)} \cdot \sin\left(\omega \cdot t_{(n)} + \frac{\phi_{(n)}}{m}\right) \quad (4)$$

wherein $\mu_{a2}$: step size parameter

[Math. 5]

$$\mu_{\phi 2} \cdot e_{(n)} \cdot \cos\left(\omega \cdot t_{(n)} + \frac{\phi_{(n)}}{m}\right) \quad (5)$$

wherein $\mu_{\phi 2}$: step size parameter

On the other hand, the amplitude update term $\Delta a_{(n+1)}$ and the phase update term $\Delta\phi_{(n+1)}$ can be terms using the transfer function G. In this case, preferably the active vibration or noise suppression system further comprises an estimated transfer function storage unit for storing an estimate value of a transfer function between the control signal generating unit and the evaluation point beforehand; and at least one of the amplitude coefficient a1 and the phase coefficient φ1 in Expression (2) and at least one of the amplitude coefficient a2 and the phase coefficient φ2 in Expression (3) are coefficients obtained based on the estimate value of the transfer function.

In this case, even if a difference between a phase component $\Phi_G$ of the transfer function G and a phase component $\hat{\Phi}_G$ of an estimated transfer function Gh is out of a range from −90° to 90°, eventually control can be converged without being diverged. For example, even if the phase difference is 180°, control can be converged. It should be noted that a higher accuracy in identifying the transfer function allows a faster convergence.

When the estimated transfer function is used, it is preferred that Expression (2) is Expression (6), and Expression (3) is Expression (7). This allows reliable convergence of control.

[Math. 6]

$$\frac{\mu_{a1} \cdot e_{(n)} \cdot \sin\left(\omega \cdot t_{(n)} + \frac{\phi_{(n)}}{m} + \frac{\hat{\Phi}}{p}\right)}{\hat{A}} \quad (6)$$

wherein:
  $\mu_{a1}$: step size parameter
  $\hat{A}$: amplitude component of an estimate value of a transfer function
  $\hat{\Phi}$: phase component of the estimate value of the transfer function
  p: coefficient

[Math. 7]

$$\mu_{\phi 1} \cdot e_{(n)} \cdot \cos\left(\omega \cdot t_{(n)} + \frac{\phi_{(n)}}{m} + \frac{\hat{\Phi}}{p}\right) \quad (7)$$

wherein $\mu_{\phi 1}$: step size parameter

Moreover, it is preferred that the stability coefficient m is set to a value greater than 1, and the phase multiplier coefficient q is set to a value greater than the stability coefficient m. Here, when q≤m, there is a risk that the amplitude filter coefficient $a_{(n)}$ may be a value greater than a convergence value. Namely, there is a risk that the amplitude filter coefficient $a_{(n)}$ may overshoot. However, since the phase can be quickly converged by making the phase multiplier coefficient q greater than the stability coefficient m, occurrence of overshooting can be suppressed.

Second Specific Embodiment of First Means

When the sine wave control signal $y_{(n)}$ is expressed by Equation (8), the sine wave or cosine wave term of the amplitude update term $\Delta a_{(n+1)}$ can contain a sine wave term in Expression (9), and the sine wave or cosine wave term of the phase update term $\Delta\phi_{(n+1)}$ can contain a cosine wave term in Expression (10).

[Math. 8]

$$y_{(n)} = a_{(n)} \cdot \sin(\omega \cdot t_{(n)} + \phi_{(n)}) \quad (8)$$

wherein:
  $y_{(n)}$: sine wave control signal
  $a_{(n)}$: amplitude filter coefficient
  $\phi_{(n)}$: phase filter coefficient
  ω: angular frequency
  $t_{(n)}$: sampling time
  (n): the number of samples (time step)

[Math. 9]

$$a1 \cdot e_{(n)} \cdot \sin\left(\omega \cdot t_{(n)} + \frac{\phi_{(n)}}{m} + \phi 1\right) \quad (9)$$

wherein:
  $e_{(n)}$: residual error signal
  a1: amplitude coefficient
  φ1: phase coefficient
  m: stability coefficient (m>1)

[Math. 10]

$$a2 \cdot e_{(n)} \cdot \cos\left(\omega \cdot t_{(n)} + \frac{\phi_{(n)}}{m} + \phi 2\right) \quad (10)$$

wherein:
  a2: amplitude coefficient
  φ2: phase coefficient

Owing to this, as shown in Expression (9), a last updated value of the phase filter coefficient $\phi_{(n)}$ is contained in the phase component of the sine wave term, which is a periodic function of ω in the amplitude update term $\Delta a_{(n+1)}$. A term obtained by dividing this phase filter coefficient $\phi_{(n)}$ by a stability coefficient m is added to $\omega t_{(n)}$. Furthermore, the stability coefficient m is a value greater than 1. Moreover, as shown in Expression (10), a last updated value of the phase filter coefficient $\phi_{(n)}$ is contained in the phase component of the cosine wave term, which is a periodic function of ω in the phase update term $\Delta\phi_{(n+1)}$. This phase filter coefficient $\phi_{(n)}$ in this phase update term $\Delta\phi_{(n+1)}$ is also divided by the same stability coefficient m as above, and this obtained term is added to $\omega t_{(n)}$.

When the sine wave control signal $y_{(n)}$ is transmitted to the evaluation point through the transfer function G, whatever phase the control vibration or control sound has with respect to that of the vibration or noise transmitted from the source of vibration to the evaluation point, eventually control can be converged without being diverged by updating an adaptive filter coefficient W of the sine wave control signal $y_{(n)}$ with these update terms.

Then, the amplitude coefficient a1 and the phase coefficient φ1 in Expression (9) and the amplitude coefficient a2 and the phase coefficient φ2 in Expression (10) can be coefficients which are independent of the transfer function G between the control signal generating unit and the evaluation point. Even if these coefficients as the phase components of the sine wave or cosine wave terms of the amplitude update term $\Delta a_{(n+1)}$ and the phase update term $\Delta\phi_{(n+1)}$ are values which are independent of the transfer function G, eventually control can be converged. Accordingly, there is no need to identify the transfer function G and there is no need to pursue accuracy in identification. Therefore, arithmetic processing can be simplified and load of arithmetic processing can be reduced.

Here, when the amplitude coefficient a2 and the phase coefficient φ2 are coefficients which are independent of the transfer function G, it is preferred that Expression (9) is Expression (11), and Expression (10) is Expression (12). This allows reliable convergence of control.

[Math. 11]

$$\mu_{a2} \cdot e_{(n)} \cdot \sin\left(\omega \cdot t_{(n)} + \frac{\phi_{(n)}}{m}\right) \quad (11)$$

wherein $\mu_{a2}$: step size parameter

[Math. 12]

$$\mu_{\phi 2} \cdot e_{(n)} \cdot \cos\left(\omega \cdot t_{(n)} + \frac{\phi_{(n)}}{m}\right) \quad (12)$$

wherein $\mu_{\phi 2}$: step size parameter

On the other hand, the amplitude update term $\Delta a_{(n+1)}$ and the phase update term $\Delta\phi_{(n+1)}$ can be terms using the transfer function G. In this case, preferably the active vibration or noise suppression system further comprises an estimated transfer function storage unit for storing an estimate value of a transfer function between the control signal generating unit and the evaluation point beforehand; and at least one of the amplitude coefficient a1 and the phase coefficient φ1 in Expression (9), and at least one of the amplitude coefficient a2 and the phase coefficient φ2 in Expression (10) are coefficients obtained based on the estimate value of the transfer function.

In this case, even if a difference between a phase component $\Phi_G$ of the transfer function G and a phase component $\Phi h_G$ of an estimated transfer function Gh is out of a range from −90° to 90°, eventually control can be converged without being diverged. For example, even if the phase difference is 180°, the control can be converged. It should be noted that a higher accuracy in identifying the transfer function allows a faster convergence.

When the estimated transfer function is used, it is preferred that Expression (9) is Expression (13), and Expression (10) is Expression (14). This allows reliable convergence of control.

[Math. 13]

$$\frac{\mu_{a1} \cdot e_{(n)} \cdot \sin\left(\omega \cdot t_{(n)} + \frac{\phi_{(n)}}{m} + \frac{\hat{\Phi}}{p}\right)}{\hat{A}} \quad (13)$$

wherein:
  $\mu_{a1}$: step size parameter
  $\hat{A}$: amplitude component of an estimate value of a transfer function
  $\hat{\Phi}$: phase component of the estimate value of the transfer function
  p: coefficient

[Math. 14]

$$\mu_{\phi 1} \cdot e_{(n)} \cdot \cos\left(\omega \cdot t_{(n)} + \frac{\phi_{(n)}}{m} + \frac{\hat{\Phi}}{p}\right) \quad (14)$$

wherein $\mu_{\phi 1}$: step size parameter

Moreover, an initial value $\phi_{(0)}$ of the phase filter coefficient can be set within a range which satisfies Inequality (15). Here, averaging processing is performed on (an averaging method is applied to) the respective amplitude and phase filter coefficients for one cycle (0 to T). Then, relational expressions of the respective filter coefficient update terms are derived by using the respective averaged filter coefficients for one cycle. One or more solutions (a, φ) of the respective filter coefficients when the derived relational expressions of the respective filter coefficient update terms are 0, namely, one or more equilibrium points of the update terms are derived. Since a plurality of equilibrium points (a, φ) are generally obtained, stability analysis is performed on each of the plurality of equilibrium points (a, φ). Then, it is derived from the equilibrium points (a, φ) at which control is stable that control is stabilized by setting the phase filter coefficient within a range which satisfies Inequality (15). Therefore, since control can start from a stable state by setting an initial value of the phase filter coefficient within the range which satisfies Inequality (15), control can be suppressed from being diverged and can be converged quickly.

[Math. 15]

$$\frac{4k+1}{2}\pi < \phi_{(0)} < \frac{4k+3}{2}\pi \qquad (15)$$

wherein: k: integer

Moreover, it is preferred that the amplitude filter coefficient is a positive number. Here, one or more equilibrium points at which control is stable are derived as mentioned above. Then, it is derived from the equilibrium points (a, φ) at which control is stable that control is stabilized by making the amplitude filter coefficient a positive number. Therefore, upon updating the amplitude filter coefficient so as to be a positive number, control is suppressed from being diverged, and can be converged quickly.

Third Specific Embodiment of First Means

Furthermore, an initial value $\phi_{(0)}$ of the phase filter coefficient can be set based on a value $\phi_{(last)}$ of the phase filter coefficient at a time of last convergence. Here, the initial value $\phi_{(0)}$ of the phase filter coefficient will be described. The active vibration or noise suppression system performs adaptive control by updating an adaptive filter. If vibration or noise at its source is constant, control gradually converges upon performing adaptive control. Then the vibration or noise at the evaluation point is kept small. An adaptive filter of a sine wave control signal $y_{(n)}$ has also converged by this time. In actual control, however, sometimes the adaptive filter slightly varies and is not an absolutely constant value. Therefore, when the adaptive filter is continuously contained in a certain range which takes variation errors into account, it is determined that the adaptive filter has converged.

There are cases where sampling number n is 0 at a start of control, or sampling number n is 0 in arithmetic processing. An initial value of the adaptive filter coefficient at n=0 needs to be set to some value. Here, it is conventionally general to perform adaptive control by setting the initial value of the adaptive filter coefficient to 0 and adapting the coefficient gradually.

In contrast, an initial value $\phi_{(0)}$ of a phase filter coefficient as an adaptive filter coefficient is not simply set to 0, but is set based on a value $\phi_{(last)}$ of the phase filter coefficient at a time of last convergence. At this time, it is considered that the value $\phi_{(last)}$ of the phase filter coefficient at the time of last convergence is a value which takes into account the phase of the transfer function G at the time of last convergence. In other words, it can be said that the initial value $\phi_{(0)}$ of the phase filter coefficient follows a secular variation in the present transfer function G. Therefore, control can be suppressed from being diverged and eventually control can be converged.

The initial value $\phi_{(0)}$ of the phase filter coefficient can be the value $\phi_{(last)}$ of the phase filter coefficient at the time of last convergence. This allows simple determination of the initial value $\phi_{(0)}$ of the phase filter coefficient, and the abovementioned advantageous effect can be exhibited.

Moreover, the initial value $\phi_{(0)}$ of the phase filter coefficient can be set based on the value $\phi_{(last)}$ of the phase filter coefficient at the time of last convergence, frequency f at the time of last convergence, and frequency f at a present time. Even when frequency f at the present time has changed from frequency f at the time of last convergence, this allows setting of the initial value $\phi_{(0)}$ of the phase filter coefficient corresponding to frequency $f_s$. As a result, control can be converged quickly.

In this case, the initial value $a_{(0)}$ of the amplitude filter coefficient can be set based on frequency f at a present time. This allows fast convergence.

Moreover, a step size parameter of the amplitude update term $\Delta a_{(n+1)}$ can be set based on a value $a_{(last)}$ of the amplitude filter coefficient at the time of last convergence. It is conventionally general to set the step size parameter of the amplitude update term $\Delta a_{(n+1)}$ to a constant value. In contrast, upon setting the step size parameter of the amplitude update term $\Delta a_{(n+1)}$ based on the value $a_{(last)}$ of the amplitude filter coefficient at the time of last convergence, fast convergence can be achieved.

Furthermore, the amplitude of the transfer function G as well as the phase may vary with passage of time. It is considered that the value $a_{(last)}$ of the amplitude filter coefficient at the time of last convergence is a value which takes into account the amplitude of the transfer function G at the time of last convergence. In other words, it can be said that the step size parameter of the amplitude update term $\Delta a_{(n+1)}$ follows a secular variation in the present transfer function G. Therefore, fast convergence is reliably achieved.

Additionally, the active vibration or noise suppression system can be applied to a vehicle having an engine, and the step size parameter of the amplitude update term $\Delta a_{(n+1)}$ can be set to a value which is proportional to a value obtained by dividing the value $a_{(last)}$ of the amplitude filter coefficient at the time of last convergence by a value $trq_{(last)}$ of a driving torque variation amount of the engine at the time of last convergence.

Here, when the engine is a source of vibration or noise, vibration or noise transmitted from the engine to the evaluation point is proportional to a driving torque variation amount trq of the engine. That is to say, when control has converged, the amplitude of the transfer function G from an output of the control signal to the evaluation point corresponds to a value obtained by dividing the value $a_{(last)}$ of the amplitude filter coefficient by the value $trq_{(last)}$ of the driving torque variation amount. Upon setting the step size parameter of the amplitude update term $\Delta a_{(n+1)}$ to a value which is proportional to a value obtained by dividing the value $a_{(last)}$ of the amplitude filter coefficient at the time of last convergence by the value $trq_{(last)}$ of the driving torque variation amount at the time of last convergence as mentioned above, that step size parameter corresponds to the amplitude of the transfer function G at the time of last convergence. Therefore, fast convergence is reliably achieved.

Active Vibration Noise Suppression System according to Second Means

This means is extracted from the Third Specific Embodiment according to the first means above. That is to say, an active vibration or noise suppression system according to the present means is an active vibration or noise suppression system for actively suppressing vibration or noise at an evaluation point by outputting control vibration or control sound, wherein the active vibration or noise suppression system comprises: a control signal generating unit for generating a sine wave control signal $y_{(n)}$ constituted by frequency of a vibration or noise source, and an amplitude filter coefficient and a phase filter coefficient as an adaptive filter coefficient; a control vibration or control sound generator for outputting the control signal or control sound corresponding to the sine wave control signal $y_{(n)}$; a residual error signal detecting unit for detecting a residual error signal $e_{(n)}$ generated by interference between vibration or noise caused by the vibration or noise source and the control vibration or control sound at the evaluation point; an amplitude filter coefficient updating unit for calculating an amplitude update term $\Delta a_{(n+1)}$ to be added to or subtracted from a last updated value of the amplitude filter coefficient $a_{(n)}$ for update, so as to reduce the residual error signal $e_{(n)}$; and a phase filter coefficient updating unit for calculating a phase update term $\Delta \phi_{(n+1)}$ to be added to or subtracted from a last updated value of the phase filter coefficient $\phi_{(n)}$ for update, so as to reduce the residual error signal $e_{(n)}$. Then, an initial value $\phi_{(0)}$ of the phase filter coefficient is set based on a value $\phi_{(last)}$ of the phase filter coefficient at a time of last convergence.

According to the present means, the initial value $\phi_{(0)}$ of the phase filter coefficient as an adaptive filter coefficient is not simply set to 0 but is set based on the value $\phi_{(last)}$ of the phase filter coefficient at the time of last convergence. In this case, it is considered that the value $\phi_{(last)}$ of the phase filter coefficient at the time of last convergence is a value which takes into account the phase of the transfer function G at the time of last convergence. In other words, it can be said that the initial value $\phi_{(0)}$ of the phase filter coefficient follows a secular variation in the present transfer function G. Therefore, control can be suppressed from being diverged, and eventually the control can be converged. The respective embodiments recited in the abovementioned third specific embodiment of the first means can be applied to the present means and can exhibit substantially similar advantageous effects.

DESCRIPTION OF THE PREFERRED EMBODIMENTS

Figure 1:
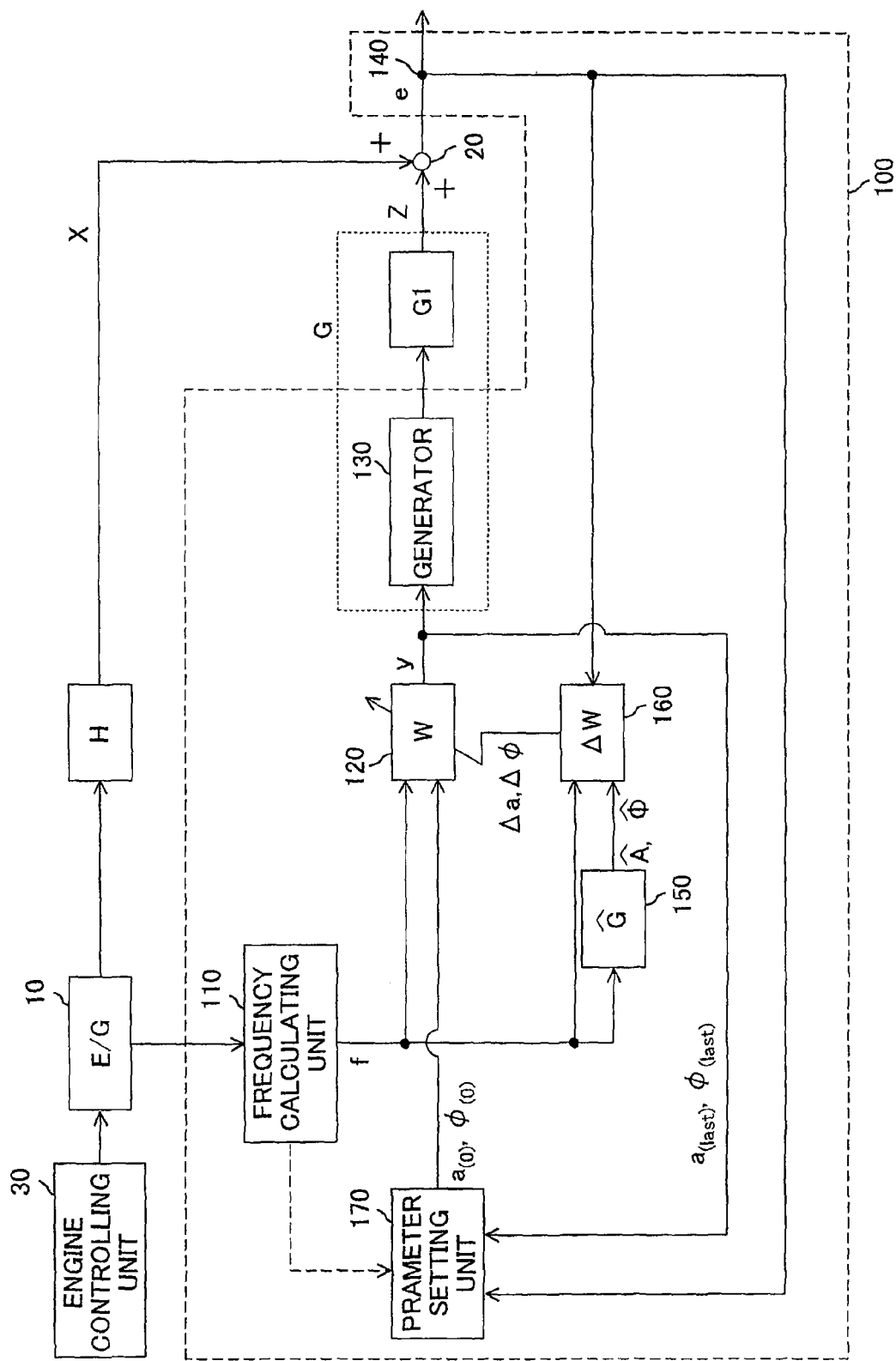
FIG. 1 is a control block diagram showing an active vibration or noise suppression system in Example 1.

Hereinafter, examples of the present invention will be described. Outlines of the respective examples will be described first and details will be described later.

In Example 1, a sine wave control signal $y_{(n)}$ is expressed by a relational expression obtained by multiplying a phase filter coefficient $\phi_{(n)}$ as a phase component thereof by a phase multiplier coefficient q (q>1). In addition, in Example 1, a sine wave term of an amplitude update term $\Delta a_{(n+1)}$ and a cosine wave term of a phase update term $\Delta \Phi_{(n+1)}$ are defined by relational expressions obtained by dividing phase components thereof by a stability coefficient m (m≥1). Furthermore, in Example 1, an initial value $\phi_{(0)}$ of the phase filter coefficient is set based on a value $\phi_{(last)}$ of the phase filter coefficient at a time of last convergence.

Example 2 is different from Example 1 in that an estimate value Gh of a first transfer function G is not used in an expression for updating an adaptive filter coefficient W.

Example 3 is different from Example 1 in that an update term $\Delta a_{(n+1)}$ for an amplitude filter coefficient $a_{(n+1)}$ and an update term $\Delta \phi_{(n+1)}$ for the phase filter coefficient $\phi_{(n+1)}$ are defined by other expressions (update terms before replacement, that is, update terms when m=1).

Example 4 is different from Example 1 in that the sine wave control signal $y_{(n)}$ is defined by a relational expression obtained by not multiplying the phase filter coefficient $\phi_{(n)}$ as a phase component thereof by a phase multiplier coefficient q. That is to say, this corresponds to the relational expression of Example 1 when q=1.

Example 5 is different from Example 4 in that the initial value $\phi_{(0)}$ of the phase filter coefficient is set to 0.

Example 6 is different from Example 5 in that the estimate value Gh of the first transfer coefficient G is not used in the expression for updating the adaptive filter coefficient W.

Example 1

1. Outline of Active Vibration Suppression System

An outline of an active vibration or noise suppression system 100 will be described. The active vibration or noise suppression system 100 is a system for generating control vibration or control sound corresponding to a sine wave control signal $y_{(n)}$ in order to actively suppress target vibration or noise at a desired position (an evaluation point) when vibration or noise is generated by various kinds of sources. That is to say, by combining control vibration or control sound with the target vibration or noise, the control vibration or control sound acts so as to cancel the target vibration or noise at the predetermined position (the evaluation point). As a result, the target vibration or noise is suppressed at the evaluation point.

Now, an automobile will be taken as an example. In the automobile, an engine (an internal combustion engine) is a source of vibration and noise and it is desired to prevent the vibration and noise generated by the engine from being transmitted to an automobile interior. Therefore, control vibration or control sound is generated by a generator in order to actively suppress the vibration and noise generated by the engine. Hereinafter, the active vibration or noise suppression system will be described taking an example of a system applied to an automobile and suppressing vibration or noise generated by an engine. However, the present invention is not limited to this kind of system. The present invention can be applied to anything which generates vibration or noise to be suppressed.

An adaptive control algorithm used by the active vibration or noise suppression system is an adaptive least mean-square filter (filtered-x LMS), particularly, a DXHS algorithm. That is to say, this system is a system which calculates an amplitude filter coefficient $a_{(n)}$ and a phase filter coefficient $\phi_{(n)}$ as an adaptive filter coefficient $W_{(n)}$, generates a sine wave control signal $y_{(n)}$ by using these filter coefficients $a_{(n)}$, $\phi_{(n)}$, and angular frequency ω of vibration or noise of the engine, and outputs control vibration or control sound corresponding to the sine wave control signal $y_{(n)}$, thereby actively suppressing vibration or noise at an evaluation point 20.

2. Detailed Construction of Active Vibration Noise Suppression System

Detailed construction of the active vibration or noise suppression system 100 will be described with reference to FIG. 1. The active vibration or noise suppression system 100 employs adaptive control using a DXHS algorithm as mentioned above. When the engine 10 (represented by "E/G" in FIG. 1) is driven by an engine controlling unit 30, and vibration or noise generated by the engine 10 and to be suppressed is transmitted to the evaluation point 20 through a second transfer function H as shown in FIG. 1, the active vibration or noise suppression system 100 serves to reduce the vibration or noise at the evaluation point 20.

The active vibration or noise suppression system 100 comprises a frequency calculating unit 110, a control signal generating unit 120, a generator 130, a residual error signal detecting unit 140, a first estimated transfer function setting unit (hereinafter referred to as "Gh data setting unit") 150, an adaptive filter coefficient updating unit 160, and a parameter setting unit 170. It should be noted that """ meaning an estimate value is used in mathematical expressions and drawings, but the estimate value "hat (^)" is denoted by "h" in the description of the present invention for convenience of description. Hereinafter, the respective components of the active vibration or noise suppression system 100 will be described.

The frequency calculating unit 110 has an input of a periodic pulse signal from a rotation detecting unit (not shown) for detecting the number of rotations of the engine 10, and calculates frequency f of a main component of vibration or noise (vibration or the like to be suppressed) generated by the engine 10 based on the input pulse signal. It should be noted that a value obtained by multiplying this frequency f by 2π is angular frequency ω. That is to say, the frequency calculating unit 110 can also calculate angular frequency ω.

The control signal generating unit 120 generates a sine wave control signal $y_{(n)}$. The sine wave control signal $y_{(n)}$ is expressed by Equation (16). Here, the suffix $_{(n)}$ denotes the number of samples (time step). That is to say, as apparent from Equation (16) and Equation (17), the sine wave control signal $y_{(n)}$ is a signal at time $t_{(n)}$ including, as constitutional components, angular frequency ω, and an amplitude filter coefficient $a_{(n)}$ and a phase filter coefficient $\phi_{(n)}$ as an adaptive filter coefficient $W_{(n)}$.

[Math. 16]

$$y_{(n)} = a_{(n)} \cdot \sin(\omega \cdot t_{(n)} + q \cdot \phi_{(n)}) \quad (16)$$

wherein:
$y_{(n)}$: sine wave control signal
$a_{(n)}$: amplitude filter coefficient
$\phi_{(n)}$: phase filter coefficient
ω: angular frequency
q: phase multiplier coefficient (q>1)
$t_{(n)}$: sampling time
(n): the number of samples (time step)

Here, the angular frequency ω in Equation (16) is a value calculated based on frequency f calculated by the frequency calculating unit 110, or a value calculated by the frequency calculating unit 110. Therefore, the sine wave control signal $y_{(n)}$ is a value corresponding to the frequency f of the main component of the vibration or noise generated by the engine 10. Moreover, as shown in Equation (16), a value obtained by multiplying the phase filter coefficient $\phi_{(n)}$ by a phase multiplier coefficient q, which is greater than 1, is added to $\omega t_{(n)}$ as a phase of a periodic function (a sine function). Moreover, the amplitude filter coefficient $a_{(n)}$ and the phase filter coefficient $\phi_{(n)}$ in Equation (16) are an adaptive filter coefficient $W_{(n)}$ in a DXHS algorithm, as shown in Equation (17), and are adaptively updated.

[Math. 17]

$$W_{(n)} = \begin{pmatrix} a_{(n)} \\ \phi_{(n)} \end{pmatrix} \quad (17)$$

wherein:
$W_{(n)}$: adaptive filter coefficient
$a_{(n)}$: amplitude filter coefficient
$\phi_{(n)}$: phase filter coefficient An expression for updating this adaptive filter coefficient $W_{(n)}$ is given by Equation (18). Thus, the adaptive filter coefficient $W_{(n+1)}$ is updated by adding or subtracting an update term $\Delta W_{(n+1)}$ to or from a last value of $W_{(n)}$. The update term $\Delta W_{(n+1)}$ is adaptively determined by the adaptive filter coefficient updating unit 160 mentioned later.

[Math. 18]

$$W_{(n+1)} = W_{(n)} - \Delta W_{(n+1)} \quad (18)$$

If this Equation (18) is expressed by each of the amplitude filter coefficient $a_{(n)}$ and the phase filter coefficient $\phi_{(n)}$, Equation (19) and Equation (20) are given. That is to say, as shown in Equation (19), the amplitude filter coefficient $a_{(n+1)}$ is updated by adding or subtracting an amplitude update term $\Delta a_{(n+1)}$ to or from a last updated value $a_{(n)}$ of the amplitude filter coefficient. On the other hand, as shown in Equation (20), the phase filter coefficient $\phi_{(n+1)}$ is updated by adding or subtracting a phase update term $\Delta\phi_{(n+1)}$ to or from a last updated value $\phi_{(n)}$ of the amplitude filter coefficient.

[Math. 19]

$$a_{(n+1)} = a_{(n)} - \Delta a_{(n+1)} \tag{19}$$

[Math. 20]

$$\phi_{(n+1)} = \phi_{(n)} - \Delta\phi_{(n+1)} \tag{20}$$

Here, an initial value $a_{(0)}$ of the amplitude filter coefficient and an initial value $\phi_{(0)}$ of the phase filter coefficient are set by the parameter setting unit 170 mentioned later. Here, sampling number n can be reset by a start of the engine 10. In this case, sampling number n=0 means a time point when the engine 10 starts. In addition to this, when n reaches a possible maximum value $n_{(max)}$ in arithmetic processing, n=0.

The generator 130 is a device for actually generating vibration or sound. This generator 130 is driven based on the sine wave control signal $y_{(n)}$ generated by the control signal generating unit 120. Examples of the generator 130 for generating control vibration include a vibration generator placed, say, on a frame connected to a driving system of a vehicle or on a sub-frame such as a suspension member. On the other hand, examples of the generator 130 for generating control sound include a speaker placed in a vehicle interior. When the generator 130 is a device for generating control vibration or control sound by using magnetic force such as a solenoid and a voice coil, the generator 130 generates control vibration or control sound corresponding to the sine wave control signal $y_{(n)}$ by driving an electric current, a voltage or an electric power to be supplied to a coil (not shown) in a manner to correspond to the sine wave control signal $y_{(n)}$ at each time $t_{(n)}$.

Then, at the evaluation point 20, control vibration or control sound $Z_{(n)}$ transmitted through a transmission system G1 from the control vibration or control sound generated by the generator 130 interferes with vibration or noise $X_{(n)}$ transmitted through a second transfer function H from vibration or noise generated by the engine 10 and to be suppressed.

Then, the residual error signal detecting unit 140 is placed at the evaluation point 20 and detects residual vibration or residual noise $e_{(n)}$ (corresponding to a "residual error signal" in the present invention) generated by interference at the evaluation point 20. This residual error signal $e_{(n)}$ is expressed by Equation (21). Examples of the residual error signal detecting unit 140 for detecting residual vibration include an accelerator sensor. On the other hand, examples of the residual error signal detecting unit 140 for detecting residual sound include a sound absorbing microphone. It is ideal that the residual error signal $e_{(n)}$ detected by the residual error signal detecting unit 140 is 0.

[Math 21]

$$e_{(n)} = X_{(n)} + Z_{(n)} \tag{21}$$

wherein:
- $e_{(n)}$: residual error signal at an evaluation point
- $X_{(n)}$: target vibration or noise at the evaluation point generated by a vibration or noise source and transmitted therefrom through a second transfer function H
- $Z_{(n)}$: control vibration or control sound at the evaluation point generated according to the control signal and transmitted therefrom through a first transfer function G Here, the first transfer function G is a transfer function of a transmission system between the control signal generating unit 120 and the evaluation point 20. That is to say, the first transfer function G contains a transfer function of the generator 130 itself and a transfer function of a transmission system G1 between the generator 130 and the evaluation point 20.

The first transfer function G is expressed by an amplitude component $A_G$ and a phase component $\phi_G$ which correspond to frequency f. On the other hand, the second transfer function H is a transfer function of a transmission system between the engine 10 and the evaluation point 20. That is to say, the second transfer function H is expressed by an amplitude component $A_H$ and a phase component $\phi_H$. Then, Equation (21) is expressed by Equation (22).

[Math. 22]

$$e_{(n)} = A_H \cdot \sin(\omega \cdot t_{(n)} + \Phi_H) + A_G \cdot a_{(n)} \cdot \sin(\omega \cdot t_{(n)} + q \cdot \phi_{(n)} + \Phi_G) \tag{22}$$

The Gh data setting unit 150 stores a first estimated transfer function Gh (an estimate value of the first transfer function G) calculated by known processing for identifying the transfer function. The first transfer function G is expressed by the amplitude component $A_G$ and the phase component $\Phi_G$ which correspond to frequency f. Therefore, as shown in Equation (23), the first estimate transfer function Gh is expressed by an amplitude component $Ah_G$ and a phase component $\Phi h_G$ which correspond to frequency f. It should be noted that since all the first estimated transfer function Gh, the amplitude component $Ah_G$ and the phase component $\phi h_G$ in Equation (23) correspond to frequency f, these are respectively denoted by Gh(f), $Ah_G$(f) and $\Phi h_G$(f) in order to clearly state that these are functions of f.

[Math. 23]

$$\hat{G}(f) = \begin{pmatrix} \hat{A}_G(f) \\ \hat{\Phi}_G(f) \end{pmatrix} \tag{23}$$

$\hat{G}(f)$: first estimated transfer function corresponding to frequency f
$\hat{A}_G(f)$: amplitude component of the first estimated transfer function corresponding to frequency f
$\hat{\Phi}_G(f)$: phase component of the first estimated transfer function corresponding to frequency f The Gh data setting unit 150 selects a value of the first estimate transfer function Gh corresponding to the frequency f calculated by the frequency calculating unit 110 among stored values of the first estimated transfer function Gh. That is to say, the Gh data setting unit 150 determines the amplitude component $Ah_G$ and the phase component $\Phi h_G$ corresponding to the frequency f calculated by the frequency calculating unit 110.

The adaptive filter coefficient updating unit 160 (corresponding to an "amplitude filter coefficient updating unit" and a "phase filter coefficient updating unit" of the present invention) calculates an update term $\Delta W_{(n+1)}$ to be added to or subtracted from the adaptive filter coefficient $W_{(n)}$ generated by the control signal generating unit 120, so as to reduce the residual error signal $e_{(n)}$. The adaptive filter coefficient $W_{(n)}$ is constituted by the amplitude filter coefficient $a_{(n)}$ and the phase filter coefficient $\phi_{(n)}$ as mentioned above. That is to say, the adaptive filter coefficient updating unit 160 calculates an amplitude update term $\Delta a_{(n+1)}$ to be added to or subtracted from the amplitude filter coefficient $a_{(n)}$, and a phase update term $\Delta \Phi_{(n+1)}$ to be added to or subtracted from the phase filter coefficient $\phi_{(n)}$.

This adaptive filter coefficient updating unit 160 calculates the update term $nW_{(n+1)}$ for the adaptive filter coefficient $W_{(n)}$ so as to minimize an evaluation function $J_{(n)}$ set based on the residual error signal $e_{(n)}$. Moreover, in order to use a DXHS algorithm, the adaptive filter coefficient updating unit 160 uses the frequency f (or angular frequency ω) calculated by the frequency calculating unit 110, and the amplitude component $Ah_G$ and the phase component $\Phi h_G$ of the first estimated transfer function Gh determined by the Gh data setting unit 150, in calculating the update term $\Delta W_{(n+1)}$.

How to derive the update term $\Delta W_{(n+1)}$ for the adaptive filter coefficient $W_{(n)}$ in the adaptive filter coefficient updating unit 160 will be described below. The evaluation function $J_{(n)}$ is defined as Equation (24). That is to say, the evaluation function $J_{(n)}$ is a square of the residual error signal $e_{(n)}$ detected by the residual error signal detecting unit 140. That is to say, the sine wave control signal $Y_{(n)}$ which minimizes the evaluation function $J_{(n)}$ is calculated.

[Math. 24]

$$J_{(n)} = e_{(n)}^2 \tag{24}$$

Next, a gradient vector $\nabla_{(n)}$ in the LMS algorithm is calculated by Equation (25). The gradient vector $\nabla_{(n)}$ is obtained by partially differentiating the evaluation function $J_{(n)}$ with respect to the adaptive filter coefficient $W_{(n)}$. Then the gradient vector $\nabla_{(n)}$ is expressed as the right side of Equation (25).

[Math. 25]

$$\nabla_{(n)} = \frac{\partial J_{(n)}}{\partial W_{(n)}} = 2e_{(n)} \cdot \frac{\partial e_{(n)}}{\partial W_{(n)}} \tag{25}$$

Then, as shown in Equation (26), a term obtained by multiplying the calculated gradient vector $\nabla_{(n)}$ by a step size parameter is used as an update term $\Delta W_{(n+1)}$.

[Math. 26]

$$\Delta W_{(n+1)} = \mu \cdot (\nabla_{(n)})$$
$$= \mu \left( 2e_{(n)} \cdot \frac{\partial e_{(n)}}{\partial W_{(n)}} \right) \tag{26}$$

From Equation (18) and Equation (26), the expression for updating the adaptive filter coefficient $W_{(n)}$ is expressed by Equation (27).

[Math. 27]

$$W_{(n+1)} = W_{(n)} - \mu \left( 2e_{(n)} \cdot \frac{\partial e_{(n)}}{\partial W_{(n)}} \right) \tag{27}$$

Here, the adaptive filter coefficient $W_{(n)}$ is constituted by the amplitude filter coefficient $a_{(n)}$ and the phase filter coefficient $\phi_{(n)}$ as mentioned above. Replacing the amplitude component $A_G$ and the phase component $\Phi_G$ of the first transfer function G in Equation (22) with the amplitude component $Ah_G$ and the phase component $\Phi h_G$ of the first estimated transfer function Gh, respectively, Equation (27) is calculated. Then, the amplitude update term $\Delta a_{(n+1)}$ for the amplitude filter coefficient $a_{(n)}$ is expressed by a sine wave term shown in Equation (28), and the phase update term $\Delta \Phi_{(n+1)}$ for the phase filter coefficient $\phi_{(n)}$ is expressed by a cosine wave term shown in Equation (29). Here, (1/$Ah_G$) in Equation (28) means normalization processing applied to update of the amplitude filter coefficient $a_{(n)}$.

[Math. 28]

$$\Delta a_{(n+1)} = \frac{\mu_{a1} \cdot e_{(n)} \cdot \sin(\omega \cdot t_{(n)} + q \cdot \phi_{(n)} + \hat{\Phi}_G)}{\hat{A}_G} \tag{28}$$

wherein $\mu_{a1}$: amplitude step size parameter

[Math. 29]

$$\Delta \phi_{(n+1)} = \mu_{\phi 1} \cdot e_{(n)} \cdot \cos(\omega \cdot t_{(n)} + q \cdot \phi_{(n)} + \hat{\Phi}_G) \tag{29}$$

wherein $\mu_{\phi 1}$: phase step size parameter

Here, in a case of employing the update terms in Equations (28), (29), control can be converged when a difference between the phase component $\Phi_G$ of the first transfer function G and the phase component $\Phi h_G$ of the first estimated transfer function Gh is within a range from −90° to 90°. However, if the phase difference is outside of the range from to 90°, it is a control instability region and there is a risk that control may diverge. Therefore, Equation (28) and Equation (29) are replaced with Equation (30) and Equation (31). That is to say, Equations (30), (31) are obtained by deleting the phase multiplier coefficient q from the update terms of Equations (28), (29). However, the phase multiplier coefficient q in the sine wave control signal $y_{(n)}$ shown in Equation (16) is left as it is. By doing so, control can be converged without being diverged. This theory will be described later.

[Math. 30]

$$\Delta a_{(n+1)} = \frac{\mu_{a1} \cdot e_{(n)} \cdot \sin(\omega \cdot t_{(n)} + \phi_{(n)} + \hat{\Phi}_G)}{\hat{A}_G} \tag{30}$$

[Math. 31]

$$\Delta \phi_{(n+1)} = \mu_{\phi 1} \cdot e_{(n)} \cdot \cos(\omega \cdot t_{(n)} + \phi_{(n)} + \hat{\Phi}_G) \tag{31}$$

Moreover, in order to ensure convergence, Equation (30) and Equation (31) are replaced with a sine wave term in Equation (32) and a cosine wave term in Equation (33), respectively. That is to say, in each of the update terms, the last updated value of the phase filter coefficient $\phi_{(n)}$ is divided by a stability coefficient m, which is greater than 1. Note that the phase multiplier coefficient q is a value greater than the stability coefficient m. Additionally, in each of the update terms, the phase component $\Phi h_G$ of the first estimated transfer function Gh is divided by any given coefficient p. This coefficient p contains 1 and can be a number other than 1. By doing so, convergence can be reliably achieved.

[Math. 32]

$$\Delta a_{(n+1)} = \frac{\mu_{a1} \cdot e_{(n)} \cdot \sin\left(\omega \cdot t_{(n)} + \frac{\phi_{(n)}}{m} + \frac{\hat{\Phi}_G}{p}\right)}{\hat{A}_G} \tag{32}$$

wherein:
  m: stability coefficient (m>1)
  p: any given coefficient

[Math. 33]

$$\Delta\phi_{(n+1)} = \mu_{\phi 1} \cdot e_{(n)} \cdot \cos\left(\omega \cdot t_{(n)} + \frac{\phi_{(n)}}{m} + \frac{\hat{\Phi}_G}{p}\right) \quad (33)$$

Then, an expression for updating the amplitude filter coefficient $a_{(n)}$ is given by Equation (34), and an expression for updating the phase filter coefficient $\phi_{(n)}$ is given by Equation (35).

[Math. 34]

$$a_{(n+1)} = a_{(n)} - \left\{\frac{\mu_{a1} \cdot e_{(n)} \cdot \sin\left(\omega \cdot t_{(n)} + \frac{\phi_{(n)}}{m} + \frac{\hat{\Phi}_G}{p}\right)}{\hat{A}_G}\right\} \quad (34)$$

[Math. 35]

$$\phi_{(n+1)} = \phi_{(n)} - \left\{\mu_{\phi 1} \cdot e_{(n)} \cdot \cos\left(\omega \cdot t_{(n)} + \frac{\phi_{(n)}}{m} + \frac{\hat{\Phi}_G}{p}\right)\right\} \quad (35)$$

Thus, the adaptive filter coefficient updating unit 160 calculates the amplitude update term $\Delta a_{(n+1)}$ for the amplitude filter coefficient $a_{(n)}$ and the phase update term $\Delta\phi_{(n+1)}$ for the phase filter coefficient $\phi_{(n)}$. That is to say, the control signal generating unit 120 can adaptively update the sine wave control signal $y_{(n)}$ by using these update terms $\Delta a_{(n+1)}$, $\Delta\phi_{(n+1)}$.

The parameter setting unit 170 sets an initial value $W_{(0)}$ of the adaptive filter coefficient $W_{(n)}$ for the sine wave control signal $Y_{(0)}$ in the control signal generating unit 120. Specifically, the parameter setting unit 170 sets an initial value $a_{(0)}$ of the amplitude filter coefficient and an initial value $\phi_{(0)}$ of the phase filter coefficient. Here, sampling number n=0 in the initial values $a_{(0)}$ $\phi_{(0)}$ is, for example, a time point when the engine 10 starts, as mentioned above. In this case, sampling number n increases from the start of the engine 10 to a stop of the engine 10. In addition to this, when n reaches a possible maximum value $n_{(max)}$ in arithmetic processing, n=0.

First, the initial value $a_{(0)}$ of the amplitude filter coefficient is set to 0, as shown in Equation (36). The initial value $\phi_{(0)}$ of the phase filter coefficient is set to a value $\phi_{(last)}$ of the phase filter coefficient at a time of last convergence, as shown in Equation (37). It should be noted that although the initial value $\phi_{(0)}$ is set to the value $\phi_{(last)}$ of the phase filter coefficient at the time of last convergence in Equation (37), the initial value $\phi_{(0)}$ can be a value which is proportional to the value $\phi_{(last)}$ of the phase filter coefficient at the time of last convergence.

[Math. 36]

$$a_{(0)} = 0 \quad (36)$$

[Math. 37]

$$\phi_{(0)} = \phi_{(last)} \quad (37)$$

wherein $\phi_{(last)}$: value of the phase filter coefficient at a time of last convergence Here, the parameter setting unit 170 acquires and stores the value $\phi_{(last)}$ of the phase filter coefficient to be used as the initial value $\phi_{(0)}$ in the following manner. The parameter setting unit 170 constantly acquires the residual error signal $e_{(n)}$ detected by the residual error signal detecting unit 140, determines whether an absolute value of the residual error signal $e_{(n)}$ is equal to or below a predetermined value, which is close to 0, thereby determining whether control has converged or not. In addition to the residual error signal $e_{(n)}$, whether the control has converged or not can also be determined by whether an absolute value of the amplitude update term $\Delta a_{(n+1)}$ for the amplitude filter coefficient $a_{(n)}$ or the phase update term $\Delta\Phi_{(n+1)}$ for the phase filter coefficient $\phi_{(n)}$ is equal to or below a predetermined value, which is close to 0. The parameter setting unit 170 acquires the value $\phi_{(last)}$ of the phase filter coefficient at the time when it is determined that control has converged, from the control signal generating unit 120. The parameter setting unit 170 stores the thus obtained value $\phi_{(last)}$ of the phase filter coefficient at the time of last convergence.

Here, the initial value $a_{(0)}$ of the amplitude filter coefficient is always kept at 0 in Equation (36) above. In addition to this, the initial value $a_{(0)}$ of the amplitude filter coefficient can also be set to a value corresponding to frequency f. In this case, for example, the parameter setting unit 170 stores a map about the initial value $a_{(0)}$ of the amplitude filter coefficient corresponding to the frequency f, and sets the initial value $a_{(0)}$ of the amplitude filter coefficient based on the present frequency f and information stored in that map. Upon setting the initial value $a_{(0)}$ of the amplitude filter coefficient corresponding to the present frequency f, fast convergence can be achieved.

Moreover, in Equation (37) above, the initial value $\phi_{(0)}$ of the phase filter coefficient is set to the value $\phi_{(last)}$ of the phase filter coefficient at the time of last convergence. In addition to this, the initial value $\phi_{(0)}$ of the phase filter coefficient can be set to a value corresponding to the frequency f. In this case, the parameter setting unit 170 stores a value $\phi_{(last)}$ of the phase filter coefficient at a time of last convergence and frequency f at the time of last convergence beforehand, and sets the initial value $\phi_{(0)}$ of the phase filter coefficient to a value obtained by multiplying the value $\phi_{(last)}$ of the phase filter coefficient at the time of last convergence by a coefficient for converting the frequency f at the time of last convergence into the present frequency f. For example, the parameter setting unit 170 stores a map about a conversion coefficient (a proportionality coefficient) of the phase filter coefficient corresponding to frequency f beforehand, and sets the initial value $\phi_{(0)}$ of the phase filter coefficient to a value obtained by multiplying the value $\phi_{(last)}$ of the phase filter coefficient at a time of last convergence by this conversion coefficient. By thus setting the initial value $\phi_{(0)}$ of the phase filter coefficient corresponding to the present frequency f, fast convergence can be achieved.

When the parameter setting unit 170 thus sets the respective initial values based on the frequency f, information is transmitted from the frequency calculating unit 110 to the parameter setting unit 170 in FIG. 1. That is to say, in FIG. 1, information transmission is indicated by a broken line arrow from the frequency calculating unit 110 to the parameter setting unit 170. It should be noted that since information is not transmitted from the frequency calculating unit 110 to the parameter setting unit 170 in the examples in which the initial values not corresponding to the frequency f are set as mentioned above, the information transmission is indicated by the broken line arrow in FIG. 1.

2. Theoretical Description

Next, theoretical description will be given on update of the amplitude update term $a_{(n+1)}$ for the amplitude filter coefficient $a_{(n)}$ and the phase update term $\Delta\phi_{(n+1)}$ for the phase filter coefficient $\phi_{(0)}$, as mentioned above. A basic formula of the abovementioned DXHS algorithm is given by Equations (38), when Equation (22), Equation (30) and Equation (31) are expressed in continuous time. In reality, however, not Equations (30), (31) but Equations (32), (33) are used as mentioned above. It should be noted that (t) expresses a function of time t in the following description. Moreover, it is defined that $\Phi_{imag}(t) = q \times \phi(t)$, and $\mu_{\phi 11} = q \times \mu_{\phi 1}$.

[Math. 38]

$$e(t) = D \cdot \sin(\omega \cdot t) + A_G \cdot a(t) \cdot \sin(\omega \cdot t + \phi_{imag}(t) + \Phi_G) \quad (38)$$

$$\frac{da(t)}{dt} = -\frac{\mu_{a1} \cdot e(t) \cdot \sin\left(\omega \cdot t + \frac{\phi_{imag}(t)}{q} + \frac{\hat{\Phi}_G}{p}\right)}{\hat{A}_G}$$

$$\frac{d\phi_{imag}(t)}{dt} = -\mu_{\phi 11} \cdot e(t) \cdot \cos\left(\omega \cdot t + \frac{\phi_{imag}(t)}{q} + \frac{\hat{\Phi}_G}{p}\right)$$

Then, for more simplification, the amplitude components $A_G$ and $Ah_G$ are omitted and the update term $da/dt$ is returned to before normalization in Equations (38). Then, Equations (38) are expressed by Equations (39).

[Math. 39]

$$e(t) = D \cdot \sin(\omega \cdot t) + a(t) \cdot \sin(\omega \cdot t + \phi_{imag}(t) + \Phi_G) \quad (39)$$

$$\frac{da(t)}{dt} = -\mu_{a1} \cdot e(t) \cdot \sin\left(\omega \cdot t + \frac{\phi_{imag}(t)}{q} + \frac{\hat{\Phi}_G}{p}\right)$$

$$\frac{d\phi_{imag}(t)}{dt} = -\mu_{\phi 11} \cdot e(t) \cdot a(t) \cdot \cos\left(\omega \cdot t + \frac{\phi_{imag}(t)}{q} + \frac{\hat{\Phi}_G}{p}\right)$$

Considering that control is stable, it is necessary to satisfy that $e^2 \to 0$ when $t \to \infty$. That is to say, stability of control is guaranteed if Inequality (40) is satisfied when t is sufficiently great.

[Math. 40]

$$\frac{de^2}{dt} < 0 \quad (40)$$

Then, from the first equation of Equations (39), Equation (41) is given.

[Math. 41]

$$\frac{de(t)^2}{dt} = 2e(t) \cdot \frac{de(t)}{dt} \quad (41)$$

$$= 2e(t) \cdot \begin{pmatrix} D \cdot \omega \cdot \cos(\omega \cdot t) + \frac{da(t)}{dt} \cdot \\ \sin(\omega \cdot t + \phi_{imag}(t) + \Phi_G) + \\ a(t) \cdot \left(\omega + \frac{d\phi_{imag}(t)}{dt}\right) \cdot \\ \cos(\omega \cdot t + \phi_{imag}(t) + \Phi_G) \end{pmatrix}$$

Substituting the second equation and the third equation of Equations (39) into Equation (41) and expanding yields Equation (42).

[Math. 42]

$$\frac{de(t)^2}{dt} = 2e(t) \cdot D \cdot \omega \cdot \cos(\omega \cdot t) - \quad (42)$$

$$2\mu_{a1} \cdot e(t)^2 \cdot \sin(\omega \cdot t + \phi_{imag}(t) + \Phi_G) \cdot \sin\left(\omega \cdot t + \frac{\phi_{imag}(t)}{q} + \frac{\hat{\Phi}_G}{p}\right) +$$

$$2e(t) \cdot a(t) \cdot \omega \cdot \cos(\omega \cdot t + \phi_{imag}(t) + \Phi_G) - 2\mu_{\phi 11} \cdot e(t)^2 \cdot a(t)^2 \cdot$$

$$\cos(\omega \cdot t + \phi_{imag}(t) + \Phi_G) \cdot \cos\left(\omega \cdot t + \frac{\phi_{imag}(t)}{q} + \frac{\hat{\Phi}_G}{p}\right)$$

Here, substituting the first equation of Equations (39) into the first term on the right side of Equation (42) and calculating yields Equation (43). On the other hand, substituting the first equation of Equation (39) into the third term on the right side of Equation (42) and calculating yields Equation (44).

[Math. 43]

$$2e(t) \cdot D \cdot \omega \cdot \cos(\omega \cdot t) = 2 \cdot D \cdot \omega \cdot \left\{ \begin{array}{l} D \cdot \sin(\omega \cdot t) + a(t) \cdot \\ \sin(\omega \cdot t + \phi_{imag}(t) + \Phi_G) \end{array} \right\} \cdot \quad (43)$$

$$\cos(\omega \cdot t)$$

$$= 2 \cdot D^2 \cdot \omega \cdot \sin(\omega \cdot t) \cdot \cos(\omega \cdot t) + 2 \cdot a(t) \cdot$$

$$D \cdot \omega \cdot \sin(\omega \cdot t + \phi_{imag}(t) + \Phi_G) \cdot \cos(\omega \cdot t)$$

[Math. 44]

$$2e(t) \cdot a(t) \cdot \omega \cdot \cos(\omega \cdot t + \phi_{imag}(t) + \Phi_G) = \quad (44)$$

$$2\{D \cdot \sin(\omega \cdot t) + a(t) \cdot \sin(\omega \cdot t + \phi_{imag}(t) + \Phi_G)\} \cdot$$

$$a(t) \cdot \omega \cdot \cos(\omega \cdot t + \phi_{imag}(t) + \Phi_G) =$$

$$2D \cdot a(t) \cdot \omega \cdot \sin(\omega \cdot t) \cdot \cos(\omega \cdot t + \phi_{imag}(t) + \Phi_G) +$$

$$2 \cdot a(t)^2 \cdot \omega \cdot \sin(\omega \cdot t + \phi_{imag}(t) + \Phi_G) \cdot \cos(\omega \cdot t + \phi_{imag}(t) + \Phi_G)$$

Then, adding Equation (43) and Equation (44) yields Expression (45).

[Math. 45]

$$2D \cdot a(t) \cdot \omega \cdot \sin(2\omega t + \phi_{imag}(t) + \Phi_G) + a(t)^2 \cdot \omega \cdot \sin(2\omega t + 2\phi_{imag}(t) + 2\Phi_G) + D^2 \cdot \omega \cdot \sin(2\omega \cdot t) \quad (45)$$

Here, calculating the second term on the right side of Equation (42) yields Expression (46). On the other hand, calculating the fourth term on the right side of Equation (45) yields Expression (47).

[Math. 46]

$$-2 \cdot \mu_{a1} \cdot e(t)^2 \cdot \sin(\omega \cdot t + \phi_{imag}(t) + \Phi_G) \cdot \sin\left(\omega \cdot t + \frac{\phi_{imag}(t)}{q} + \frac{\hat{\Phi}_G}{p}\right) = \quad (46)$$

$$\mu_{a1} \cdot e(t)^2 \cdot \left\{ \cos\left(2\omega \cdot t + \left(\phi_{imag}(t) + \frac{\phi_{imag}(t)}{q}\right) + \left(\Phi_G + \frac{\hat{\Phi}_G}{p}\right)\right) - \right.$$

$$\left. \cos\left(\left(\phi_{imag}(t) - \frac{\phi_{imag}(t)}{q}\right) + \left(\Phi_G - \frac{\hat{\Phi}_G}{p}\right)\right) \right\}$$

-continued

[Math. 47]

$$-2q \cdot \mu_{\phi 1} \cdot e(t)^2 \cdot a(t)^2 \cdot \cos(\omega \cdot t + \phi_{imag}(t) + \Phi_G) \cdot \cos\left(\omega \cdot t + \frac{\phi_{imag}(t)}{m} + \frac{\hat{\Phi}_G}{p}\right) = -\mu_{\phi 11} \cdot e(t)^2 \cdot a(t)^2 \cdot \left\{\cos\left(2\omega \cdot t + \left(\phi_{imag}(t) + \frac{\phi_{imag}(t)}{q}\right) + \left(\Phi_G + \frac{\hat{\Phi}_G}{p}\right)\right) + \cos\left(\left(\phi_{imag}(t) - \frac{\phi_{imag}(t)}{q}\right) + \left(\Phi_G - \frac{\hat{\Phi}_G}{p}\right)\right)\right\} \quad (47)$$

Then, adding Expression (46) and Expression (47) yields Expression (48).

[Math. 48]

$$e(t)^2 \cdot (\mu_{a1} - \mu_{\phi 11} \cdot a(t)^2) \cdot \cos\left(2\omega \cdot t + \left(\phi_{imag}(t) + \frac{\phi_{imag}(t)}{q}\right) + \left(\Phi_G - \frac{\hat{\Phi}_G}{p}\right)\right) - e(t)^2 \cdot (\mu_{a1} - \mu_{\phi 11} \cdot a(t)^2) \cdot \cos\left(\left(\phi_{imag}(t) - \frac{\phi_{imag}(t)}{q}\right) + \left(\Phi_G - \frac{\hat{\Phi}_G}{p}\right)\right) \quad (48)$$

From Expression (45) and Expression (48), Equation (42) can be rewritten as Equation (49).

[Math. 49]

$$\frac{de(t)^2}{dt} = 2D \cdot a(t) \cdot \omega \cdot \sin(2\omega \cdot t + \phi_{imag}(t) + \phi_G) + a(t)^2 \cdot \omega \cdot \sin(2\omega \cdot t + 2\phi_{imag}(t) + 2\Phi_G) + D^2 \cdot \omega \cdot \sin(2\omega \cdot t) + e(t)^2 \cdot (\mu_{a1} - \mu_{\phi 11} \cdot a(t)^2) \cdot \cos\left(2\omega \cdot t + \left(\phi_{imag}(t) + \frac{\phi_{imag}(t)}{q}\right) + \left(\Phi_G + \frac{\hat{\Phi}_G}{p}\right)\right) - e(t)^2 \cdot (\mu_{a1} + \mu_{\phi 11} \cdot a(t)^2) \cdot \cos\left(\left(\phi_{imag}(t) - \frac{\phi_{imag}(t)}{q}\right) + \left(\Phi_G - \frac{\hat{\Phi}_G}{p}\right)\right) \quad (49)$$

Here, all terms except the fifth term in Equation (49) are periodic functions of $2\omega$. Moreover, considering that that control converges when $t \to \infty$, $e(t)$, $a(t)$ and $\phi(t)$ have to converge to constant values when $t \to \infty$. In this case, when $t \to \infty$, a sum of the periodic functions of the first term to the fourth term in Equation (49) has to be a constant value. It should be noted that the constant value is not limited to 0, and can be a value other than 0.

Then, in order to derive the above constant value, an average value of each of the periodic functions is calculated. The periodic functions of the first term to fourth term in Equation (49) are all functions of $\omega$. Assuming that time has sufficiently passed, the average value of each of the periodic functions is 0. This can be derived from Equation (50). In this equation, T denotes a cycle.

[Math. 50]

$$\lim_{T \to \infty} \frac{1}{T} \int_0^T f(t) dt = 0 \quad (50)$$

wherein T: cycle

Therefore, it can be estimated that a convergence value of the sum of the periodic functions of the first term to the fourth term in Equation (49) is 0. Then, it is sufficient to consider only the fifth term in Equation (49). Accordingly, from Inequality (40) and the fifth term in Equation (49), there is a need to satisfy at least the condition of Inequality (51) in order to guarantee that control is stable.

[Math. 51]

$$-e(t)^2 \cdot (\mu_{a1} + \mu_{\phi 11} \cdot a(t)^2) \cdot \cos\left(\left(\phi_{imag}(t) - \frac{\phi_{imag}(t)}{q}\right) + \left(\Phi_G - \frac{\hat{\Phi}_G}{p}\right)\right) < 0 \quad (51)$$

Here, from Inequality (52), it is necessary to satisfy the condition of Inequality (53).

[Math. 52]

$$e(t)^2 \cdot (\mu_{a1} + \mu_{\phi 11} \cdot a(t)^2) > 0 \quad (52)$$

[Math. 53]

$$\cos\left(\left(\phi_{imag}(t) - \frac{\phi_{imag}(t)}{q}\right) + \left(\Phi_G - \frac{\hat{\Phi}_G}{p}\right)\right) > 0 \quad (53)$$

From Inequality (53), it is necessary to satisfy the condition of Inequality (54). Note that n is an integer.

[Math. 54]

$$-\frac{\pi}{2} + 2n\pi < \left(\phi_{imag}(t) - \frac{\phi_{imag}(t)}{q}\right) + \left(\Phi_G - \frac{\hat{\Phi}_G}{p}\right) < \frac{\pi}{2} + 2n\pi \quad (54)$$

Since $q > 1$ and p is any given number at present, Inequality (54) can be expanded into Inequality (55). That is to say, control does not diverge by setting a phase filter coefficient $\phi(t)$ which satisfies Inequality (55) when $t \to \infty$.

[Math. 55]

$$-\frac{q\pi}{2(q-1)} + \frac{2nq\pi}{q-1} - \frac{q(p\Phi_G - \hat{\Phi}_G)}{p(q-1)} < \phi(t) < \frac{q\pi}{2(q-1)} + \frac{2nq\pi}{q-1} - \frac{q(p\Phi_G - \hat{\Phi}_G)}{p(q-1)} \quad (55)$$

Here, when a general DXHS algorithm is used unlike the DXHS algorithm in this example, q=1 in Inequality (53). In this case, if a phase difference between the phase component $\Phi_G$ of the actual first transfer function G and the phase component $\Phi h_G$ of the first estimated transfer function Gh is within a range from −90° to 90°, the condition of Inequality (53) when q=1 is satisfied. That is to say, when the phase difference is within the range from −90° to 90°, stability is guaranteed. However, if the phase difference is out of the range from −90° to 90° when q=1, control diverges. In contrast, since q>1 in the present example, control converges if Inequality (55) is satisfied, as mentioned above. For example, when q=3 and p=3, Inequality (55) is Inequality (56).

[Math. 56]

$$-\frac{3\pi}{4} + 3n\pi - \frac{3\Phi_G - \hat{\Phi}_G}{2} < \phi(t) < \frac{3\pi}{4} + 3n\pi - \frac{3\Phi_G - \hat{\Phi}_G}{2} \quad (56)$$

Figure 2:
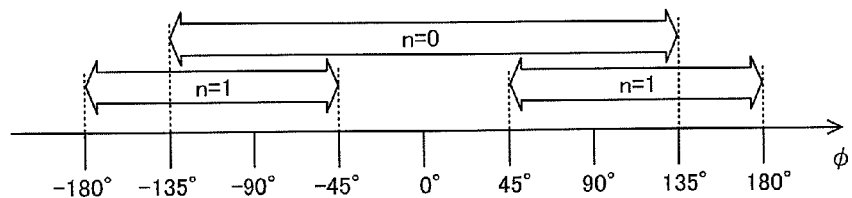
FIG. 2 shows the range of a phase filter coefficient $\phi(t)$ at each of n=0, 1 when q=p=3 and $(3\Phi_G-\Phi h_G)=0$ in Inequality (56).

In a case where the transfer function phase difference $(3\Phi_G - \Phi h_G) = 0$ in Inequality (56), the phase filter coefficient $\phi(t)$ is within a range from $-135°$ to $+135°$ when n=0, and within a range from $+405°$ to $+675°$, i.e., $+45°$ to $-45°$ when n=1. If this range is shown in a range from $-180°$ to $+180°$, the result is shown in FIG. 2. That is to say, when n=0, 1, the total of the phase filter coefficient $\phi(t)$ when n=0 and the phase filter coefficient $\phi(t)$ when n=1 can be selected from the full range of 360°. Moreover, when n=-1, the phase filter coefficient $\phi(t)$ is within a range from $-675°$ to $-405°$, i.e., $+45°$ to $-45°$. That is to say, when n=0, -1, the same result is obtained.

Figure 3:
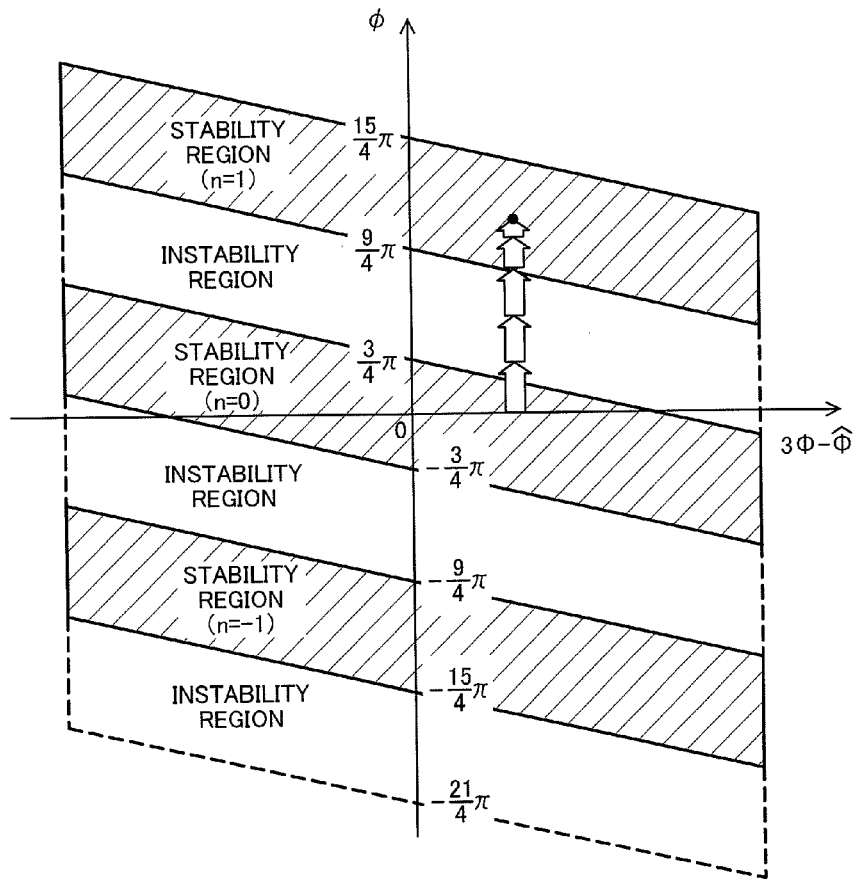
FIG. 3 shows stability regions and instability regions at each of n=-1, 0, 1 when q=p=3 in Inequality (56). The horizontal axis shows $(3\Phi_G-\Phi h_G)$ and the vertical axis shows $\phi$.

Next, a case where the transfer function phase difference $(3\Phi_G - \Phi h_G)$ is not 0 will also be considered. In this case, when n=-1, 0, 1 in Inequality (56), respective stability regions and instability regions are shown in FIG. 3. From a viewpoint of this relation, within what range the phase filter coefficient $\phi(t)$ should be selected will be discussed.

When q=p=3 and n=0, 1, the phase filter coefficient $\phi(t)$ can be selected from the full range of 360°, and the transfer function phase difference satisfies $-720° < (3\Phi_G - \Phi h_G) < +720°$. That is to say, when n=0 and $(3\Phi_G - \Phi h_G) = -720°$, $+225° < \phi(t) < +495°$. When n=1 and $(3\Phi_G - \Phi h_G) = -720°$, $+765° < \phi(t) < +1035°$. When n=0 and $(3\Phi_G - \Phi h_G) = +720°$, $-495° < \phi(t) < -225°$. When n=1 and $(3\Phi_G - \Phi h_G) = +720°$, $45° < \phi(t) < 315°$. It is apparent from these ranges that control does not diverge, that is to say, control converges by setting $-495° < \phi(t) < +495°$. In the same way of thinking as the above, it is derived that when q=p=3 and n=0, -1, control does not diverge by setting $-1035° < \phi(t) < +495°$.

Analysis

Figure 4A:
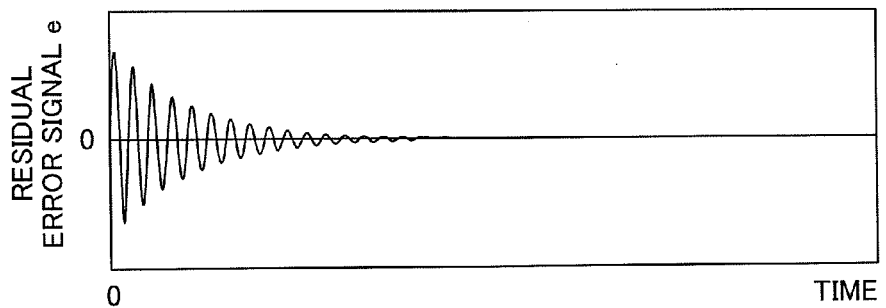
FIG. 4A shows a residual error signal in an analysis result when a phase component $\Phi_G$ of a first transfer function G and a phase component $\Phi h_G$ of a first estimated transfer function Gh have a phase difference of 150° in Example 1.
Figure 4B:
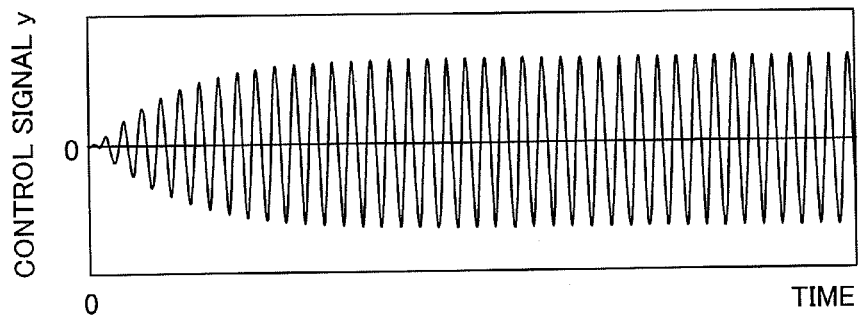
FIG. 4B shows a sine wave control signal in the above analysis result.
Figure 4C:
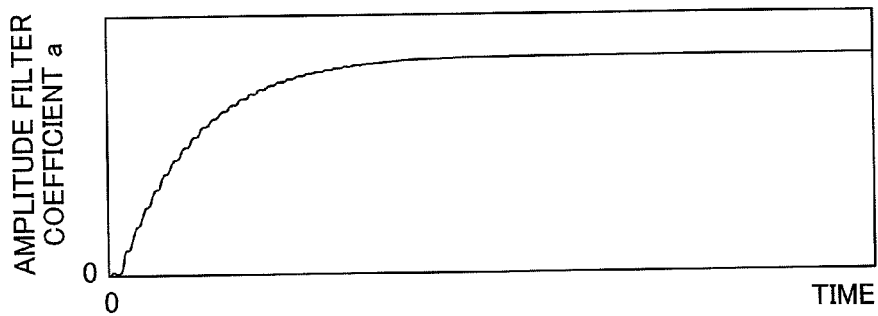
FIG. 4C shows an amplitude filter coefficient in the above analysis result.
Figure 4D:
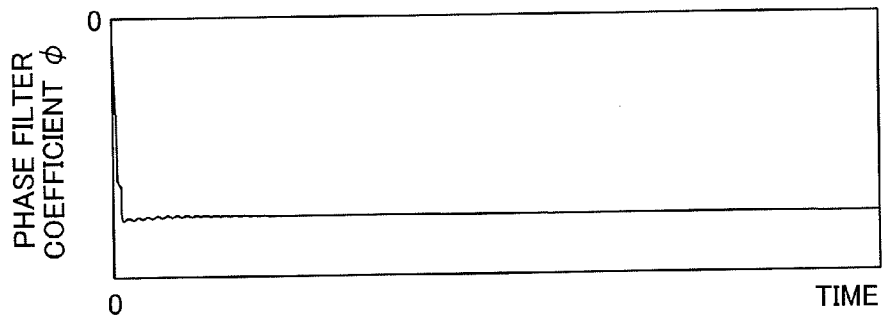
FIG. 4D shows a phase filter coefficient in the above analysis result.

Next, an analysis was performed on the above example when the phase component $\Phi_G$ of the first transfer function G and the phase component $\Phi h_G$ of the first estimated transfer function Gh had a phase difference of 180°, and the phase multiplier coefficients q=3 and m=2. The analysis result is shown in FIGS. 4A to 4D. It is apparent from FIG. 4A that the residual error signal e has converged. The sine wave control signal y at that time is shown in FIG. 4B. FIGS. 4C and 4D indicate that the amplitude filter coefficient a and the phase filter coefficient $\phi$ have respectively converged. In particular, it is apparent from FIG. 4D that the phase filter coefficient $\phi$ has converged more quickly than the amplitude filter coefficient a.

Even when the phase difference is 180°, eventually control can be thus converged quickly without being diverged. Therefore, even when the phase component of the first transfer function G and the phase component of the first estimated transfer function G are differentiated from each other by a change of the first transfer function G caused by temperature or passage of time, control can be converged quickly. Moreover, when the first estimated transfer function G is highly precise, the use of the first estimated transfer function Gh realizes fast convergence. Furthermore, the amplitude filter coefficient a has converged without becoming a value greater than a convergence value. Namely, the amplitude filter coefficient a does not overshoot. Therefore, vibration can be suppressed from increasing by the time when vibration has converged.

Moreover, as mentioned above, the initial value $\phi_{(0)}$ of the phase filter coefficient is not simply set to 0, but is set based on the value $\phi_{(last)}$ of the phase filter coefficient at the time of last convergence. At this time, it is considered that the value $\phi_{(last)}$ of the phase filter coefficient at the time of last convergence is a value which takes into account the phase of the transfer function G at the time of last convergence. In other words, it can be said that the initial value $\phi_{(0)}$ of the phase filter coefficient follows a secular variation in the present transfer function G. Accordingly, control can be suppressed from diverging and eventually control can be converged.

Here, the initial value $\phi_{(0)}$ of the phase filter coefficient can be simply set to 0 in the above example. Even by doing so, the system 100 can exhibit an advantageous effect that control can be converged without being diverged. In this case, however, the advantageous effect of fast convergence is small when compared to when the initial value $\phi_{(0)}$ of the phase filter coefficient is set based on the value $\phi_{(last)}$ of the phase filter coefficient at the time of last convergence.

Example 2

Figure 5:
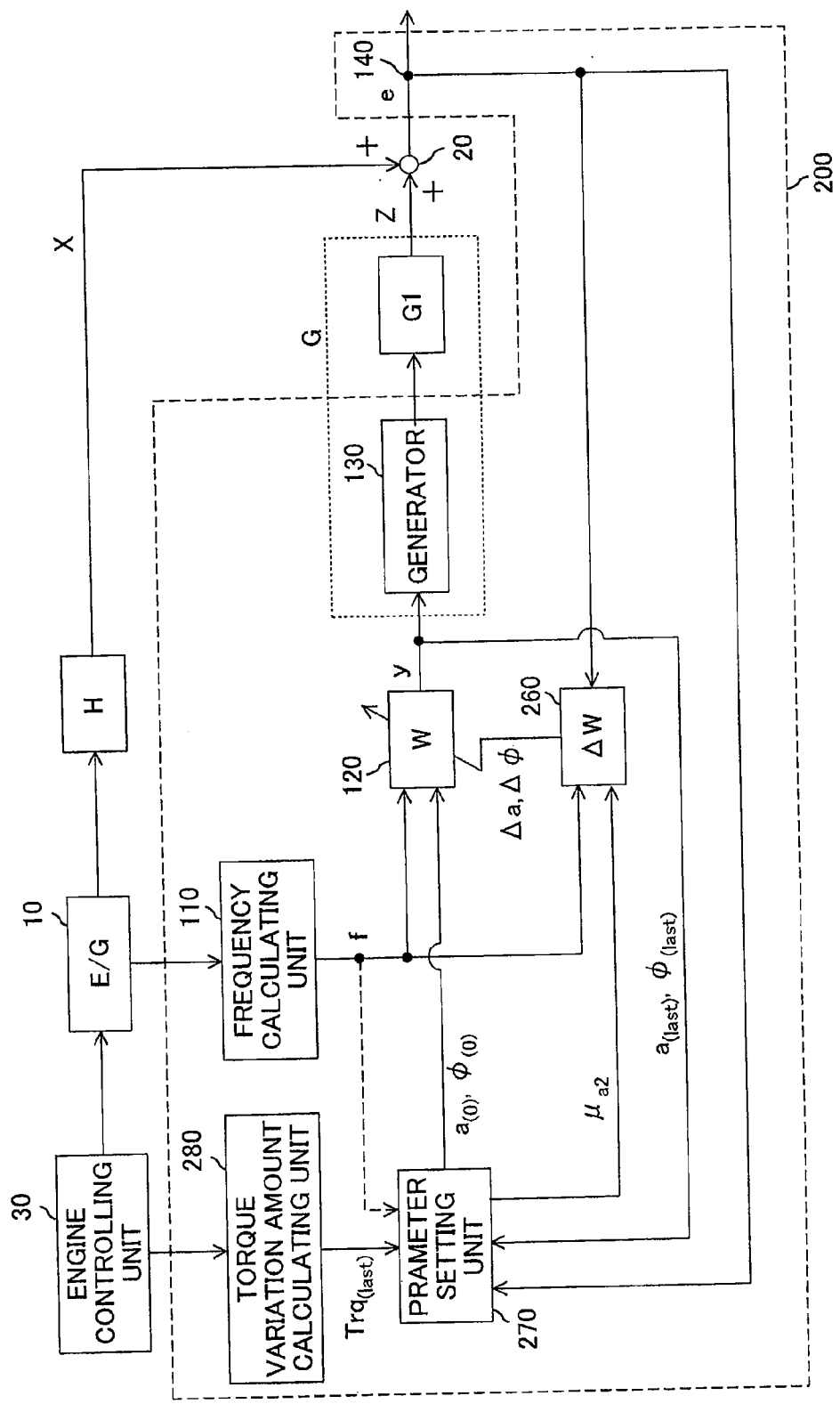
FIG. 5 is a control block diagram showing an active vibration or noise suppression system in Example 2.

An active vibration or noise suppression system 200 of the present example will be described with reference to FIG. 5. In Example 1, the estimate value Gh of the first transfer function G is used in the expression for updating the adaptive filter coefficient W. In contrast, the active vibration or noise suppression system 200 of the present example does not use the estimate value Gh of the first transfer function G in the expression for updating the adaptive filter coefficient W.

The active vibration or noise suppression system 200 comprises a frequency calculating unit 110, a control signal generating unit 120, a generator 130, a residual error signal detecting unit 140, an adaptive filter coefficient updating unit 260, a torque variation amount calculating unit 280, and a parameter setting unit 270. The same constituent components as those of Example 1 are denoted by the same reference numerals and their description will be omitted here. That is to say, the active vibration or noise suppression system 200 of the present example is different from the system 100 of Example 1 in the adaptive filter coefficient updating unit 260, the torque variation amount calculating unit 280, and the parameter setting unit 270.

The adaptive filter coefficient updating unit 260 (corresponding to the "amplitude filter coefficient updating unit" and the "phase filter coefficient updating unit" of the present invention) calculates an update term $\Delta W_{(n+1)}$ to be added to or subtracted from the adaptive filter coefficient $W_{(n)}$ generated by the control signal generating unit 120, so as to reduce the residual error signal $e_{(n)}$, just like in Example 1. This adaptive filter coefficient updating unit 260 calculates an amplitude update term $\Delta a_{(n+1)}$ to be added to or subtracted from an amplitude filter coefficient $a_{(n)}$, and a phase update term $\Delta \phi_{(n+1)}$ to be added to or subtracted from a phase filter coefficient $\phi_{(n)}$.

Here, the amplitude update term $\Delta a_{(n+1)}$ in Example 1 is as shown in Equation (32). In Equation (32), $(\mu_{a1}/AhG)$ is set to a constant amplitude step size parameter $\mu_{a2}$, which is independent of the amplitude component $Ah_G$ of the first estimated transfer function Gh, and $(\Phi h_G/p)$ is set to 0. Then the amplitude update term $\Delta a_{(n+1)}$ is expressed by Equation (57). That is to say, the amplitude update term $\Delta a_{(n+1)}$ expressed by Equation (57) is an update term which is independent of the first estimated transfer function Gh. Here, the amplitude step size parameter $\mu_{a2}$ is changed by the parameter setting unit 270, using the value $a_{(last)}$ of the amplitude filter coefficient at a time of last convergence, as mentioned later.

[Math. 57]

$$\Delta a_{(n+1)} = \mu_{a2} \cdot e_{(n)} \cdot \sin\left(\omega \cdot t_{(n)} + \frac{\phi_{(n)}}{m}\right) \quad (57)$$

wherein $\mu_{a2}$: amplitude step size parameter

Moreover, the phase update term $\Delta\phi_{(n+1)}$ in Example 1 is as shown in Equation (33). In Equation (33), ($\Phi h_G/p$) is set to 0. Then, the phase update term $\Delta\phi_{(n+1)}$ is expressed by Equation (58). That is to say, the phase update term $\Delta\phi_{(n+1)}$ expressed by Equation (58) is an update term which is independent of the first estimated transfer function Gh.

[Math. 58]

$$\Delta\phi_{(n+1)} = \mu_{\phi2} \cdot e_{(n)} \cdot \cos\left(\omega \cdot t_{(n)} + \frac{\phi_{(n)}}{m}\right) \quad (58)$$

wherein $\mu_{\phi2}$: phase step size parameter

The torque variation amount calculating unit 280 receives information about the driving torque variation amount $trq_{(n)}$ of the engine 10 from the engine control unit 30, and calculates the driving torque variation amount $trq_{(n)}$ of the engine 10. Examples of the information about the driving torque variation amount $trq_{(n)}$ include the driving torque variation amount $trq_{(n)}$ itself and a change in accelerator opening degree.

The parameter setting unit 270 sets the initial value $a_{(0)}$ of the amplitude filter coefficient and the initial value $\phi_{(0)}$ of the phase filter coefficient as shown in Equations (36), (37), like in Example 1. Moreover, the parameter setting unit 270 sets the amplitude step size parameter $\mu_{a2}$ according to Equation (59) using the value $a_{(last)}$ of the amplitude filter coefficient at a time of last convergence and the value $trq_{(last)}$ of the driving torque variation amount at the time of last convergence. As shown in Equation (59), the amplitude step size parameter $\mu_{a2}$ is set to a value obtained by dividing the value $a_{(last)}$ of the amplitude filter coefficient at a time of last convergence by the value $trq_{(last)}$ of the driving torque variation amount and multiplying the result of division by a constant step size parameter $\mu_{a3}$.

[Math. 59]

$$\mu_{a2} = \mu_{a3} \cdot \frac{a_{(last)}}{trq_{(last)}} \quad (59)$$

wherein $\mu_{a3}$: step size parameter

Here, even if the phase filter coefficient $\phi_{(n)}$ is selected from the full range of 360°, control can be converged as mentioned in Example 1. Therefore, even if the phase component $\Phi h_G$ of the first estimated transfer function Gh is not used in the phase components of the periodic functions (the sine function or the cosine function) in Equations (32), (33), it does not happen that control diverges depending on the value of the phase filter coefficient $\phi_{(n)}$. Therefore, even if the update expression which does not employ the phase component $\Phi h_G$ is used as in Equations (57), (58), control can be converged.

Moreover, in Equation (57), the amplitude component $Ah_G$ of the first estimated transfer function Gh is not used but the amplitude step size parameter $\mu_{a2}$ of the amplitude update term $\Delta a_{(n+1)}$ is based on the value $a_{(last)}$ of the amplitude filter coefficient at a time of last convergence. Here, it is considered that the value $a_{(last)}$ of the amplitude filter coefficient at the time of last convergence is a value which takes into account the amplitude of the transfer function G at the time of last convergence. In other words, it can be said that the amplitude step size parameter $\mu_{a2}$ of the amplitude update term $\Delta a_{(n+1)}$ follows a secular change in the present transfer function G.

In particular, as shown in Equation (59), the amplitude step size parameter $\mu_{a2}$ is set to a value which is proportional to a value obtained by dividing the value $a_{(last)}$ of the amplitude filter coefficient at a time of last convergence by the value $trq_{(last)}$ of the driving torque variation amount. Here, when the engine 10 is a source of vibration or noise, vibration or noise transmitted from the engine 10 to the evaluation point 20 is proportional to the driving torque variation amount trq of the engine 10. That is to say, when control has converged, the amplitude of the first transfer function G corresponds to a value obtained by dividing the value $a_{(last)}$ of the amplitude filter coefficient by the value $trq_{(last)}$ of the driving torque variation amount.

Upon setting the amplitude step size parameter $\mu_{a2}$ of the amplitude update term $\Delta a_{(n+1)}$ to the value which is proportional to the value obtained by dividing the value $a_{(last)}$ of the amplitude filter coefficient at the time of last convergence by the value $trq_{(last)}$ of the driving torque variation amount at the time of last convergence as mentioned above, this amplitude step size parameter $\mu_{a2}$ corresponds to the amplitude of the first transfer function G at the time of last convergence. Therefore, even if Equation (57) is used, fast convergence is reliably achieved without degrading in the performance to follow amplitude.

Even if the adaptive filter coefficient W is updated without using the first estimated transfer function Gh as in Example 2, thus control can be converged as reliably and quickly as in Example 1. Moreover, because the first estimated transfer function Gh is not used, there is no need to perform processing for identifying the first transfer function G, and there is no need to pursue accuracy in identification. Therefore, arithmetic processing can be simplified and load of arithmetic processing can be reduced.

Although the amplitude step size parameter $\mu_{a2}$ is set based on the value $a_{(last)}$ of the amplitude filter coefficient at the time of last convergence in the aforementioned example, the amplitude step size parameter $\mu_{a2}$ can be simply set to a constant value. Even by doing so, the system 200 can exhibit an advantageous effect that control can be converged without being diverged. In this case, however, the performance to follow amplitude degrades and the advantageous effect of fast convergence is small when compared to when the amplitude step size parameter $\mu_{a2}$ is set based on the value $a_{(last)}$ of the amplitude filter coefficient at the time of last convergence.

Example 3

Processing was carried out by replacing Equations (30), (31) with Equations (32), (33) in Example 1 above. In addition to this, Equations (30), (31) as they are can be used as the update term $\Delta a_{(n+1)}$ for the amplitude filter coefficient $a_{(n+1)}$ and the update term $\Delta\phi_{(n+1)}$ for the phase filter coefficient $\phi_{(n+1)}$. That is to say, this corresponds to Equations (32), (33) when m=1. In this case, too, control can be converged.

Example 4

In Example 1 above, the sine wave control signal $y_{(n)}$ is expressed by the relational expression in which the phase filter coefficient $\phi_{(n)}$ is multiplied by the phase multiplier coefficient q, which is greater than 1, as shown in Equation (16). In contrast, in Example 4, the sine wave control signal $y_{(n)}$ is expressed by a relational expression in which the phase filter coefficient $\phi_{(n)}$ is not multiplied by the phase multiplier coefficient q, that is, is expressed by Equation (60).
[Math. 60]

$$y_{(n)}=a_{(n)}\cdot\sin(\omega\cdot t_{(n)}+\phi_{(n)}) \quad (60)$$

wherein:
$y_{(n)}$: sine wave control signal
$a_{(n)}$: amplitude filter coefficient
$\phi_{(n)}$: phase filter coefficient
$\omega$: angular frequency
$t_{(n)}$: sampling time
(n): the number of samples (time step)

In this case, the residual error signal $e_{(n)}$ detected by the residual error signal detecting unit 140 is expressed by Equation (61).
[Math. 61]

$$e_{(n)}=A_H\cdot\sin(\omega\cdot t_{(n)}+\Phi_H)=A_G\cdot a_{(n)}\cdot\sin(\omega\cdot t_{(n)}+\phi_{(n)}+\Phi_G) \quad (61)$$

Moreover, the amplitude update term $\Delta a_{(n+1)}$ for the amplitude filter coefficient $a_{(n)}$ and the phase update term $\Delta\phi_{(n+1)}$ for the phase filter coefficient $\phi_{(n)}$ are respectively set to the sine wave term in Equation (32) and the cosine wave term in Equation (33).

Analysis

Figure 6A:
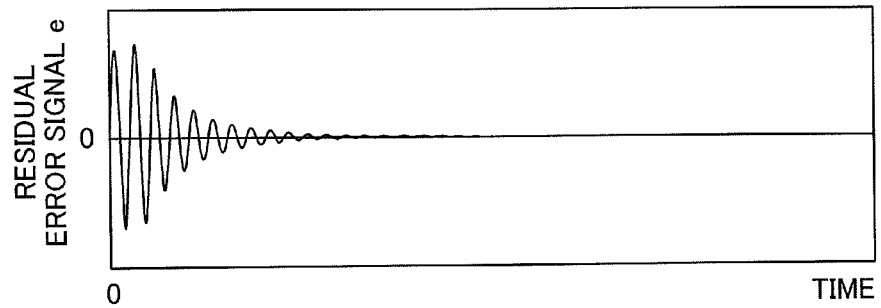
FIG. 6A shows a residual error signal in an analysis result when a phase component $\Phi_G$ of a first transfer function G and a phase component $\Phi h_G$ of a first estimated transfer function Gh have a phase difference of 150° in Example 4.
Figure 6B:
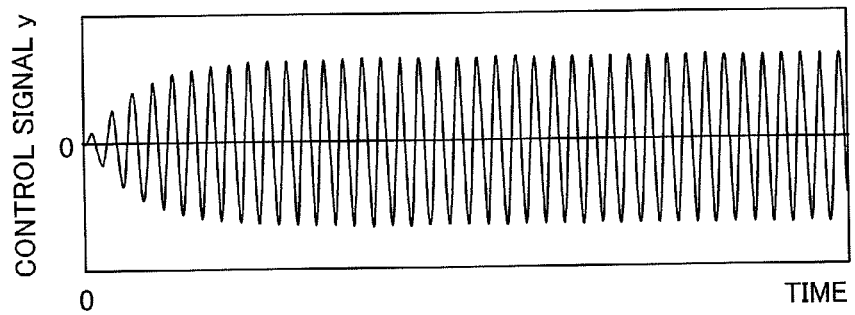
FIG. 6B shows a sine wave control signal in the above analysis result.
Figure 6C:
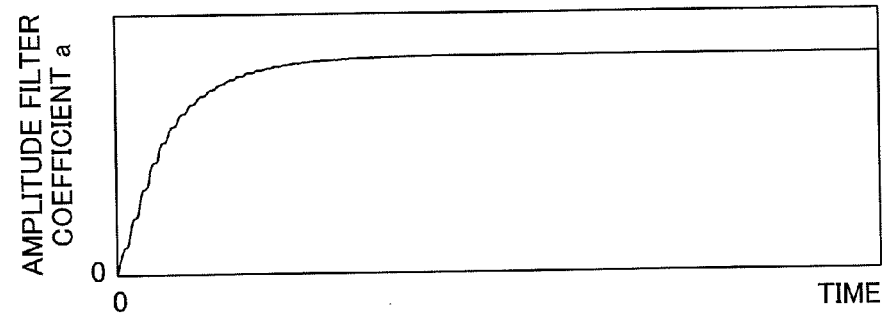
FIG. 6C shows an amplitude filter coefficient in the above analysis result.
Figure 6D:
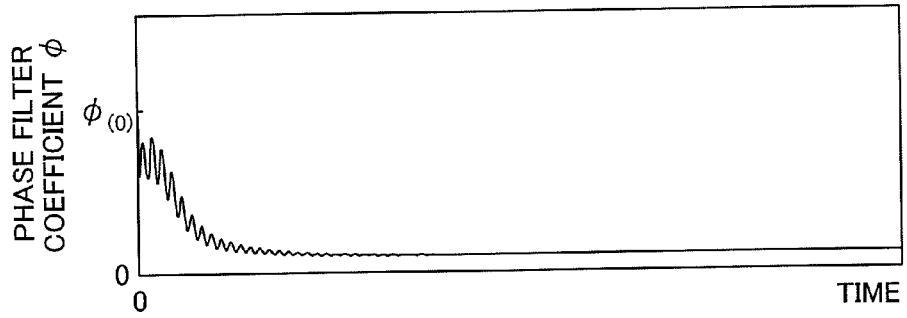
FIG. 6D shows an amplitude filter coefficient in the above analysis result.

An analysis was performed on the present example when the phase component $\Phi_G$ of the first transfer function G and the phase component $\Phi h_G$ of the first estimated transfer function Gh had a phase difference of 150°. The analysis result is shown in FIG. 6A to FIG. 6D. It is apparent from FIG. 6A that the residual error signal e has converged. The sine wave control signal y at that time is shown in FIG. 6B. FIGS. 6C and 6D indicate that the amplitude filter coefficient a and the phase filter coefficient $\phi$ have respectively converged.

Even when the phase difference is 150°, eventually control can be thus converged without being diverged. Therefore, even when the phase component of the first transfer function G and the phase component of the first estimated transfer function Gh are differentiated from each other by a change of the first transfer function G caused by temperature or passage of time, control can be converged. Moreover, when the first estimated transfer function Gh is highly precise, the use of the first estimated transfer function Gh realizes fast convergence.

When the amplitude update term $\Delta a_{(n+1)}$ for the amplitude filter coefficient $a_{(n)}$ and the phase update term $\Delta\phi_{(n+1)}$ for the phase filter coefficient $\phi_{(n)}$ are updated in the preset example, the theoretical description corresponds to that of Example 1 in which $\phi_{imag}(t)$ is replaced with $\phi(t)$ and q is replaced with m.

Example 5

In Example 4 above as well as in Example 1, the initial value $\phi_{(0)}$ of the phase filter coefficient is not simply set to 0 but is set based on the value $\phi_{(last)}$ of the phase filter coefficient at a time of last convergence. In this example, the initial value $\phi_{(0)}$ of the phase filter coefficient is set to 0. Detailed construction of an active vibration or noise suppression system 300 of the present example will be described with reference to FIG. 7.

Figure 7:
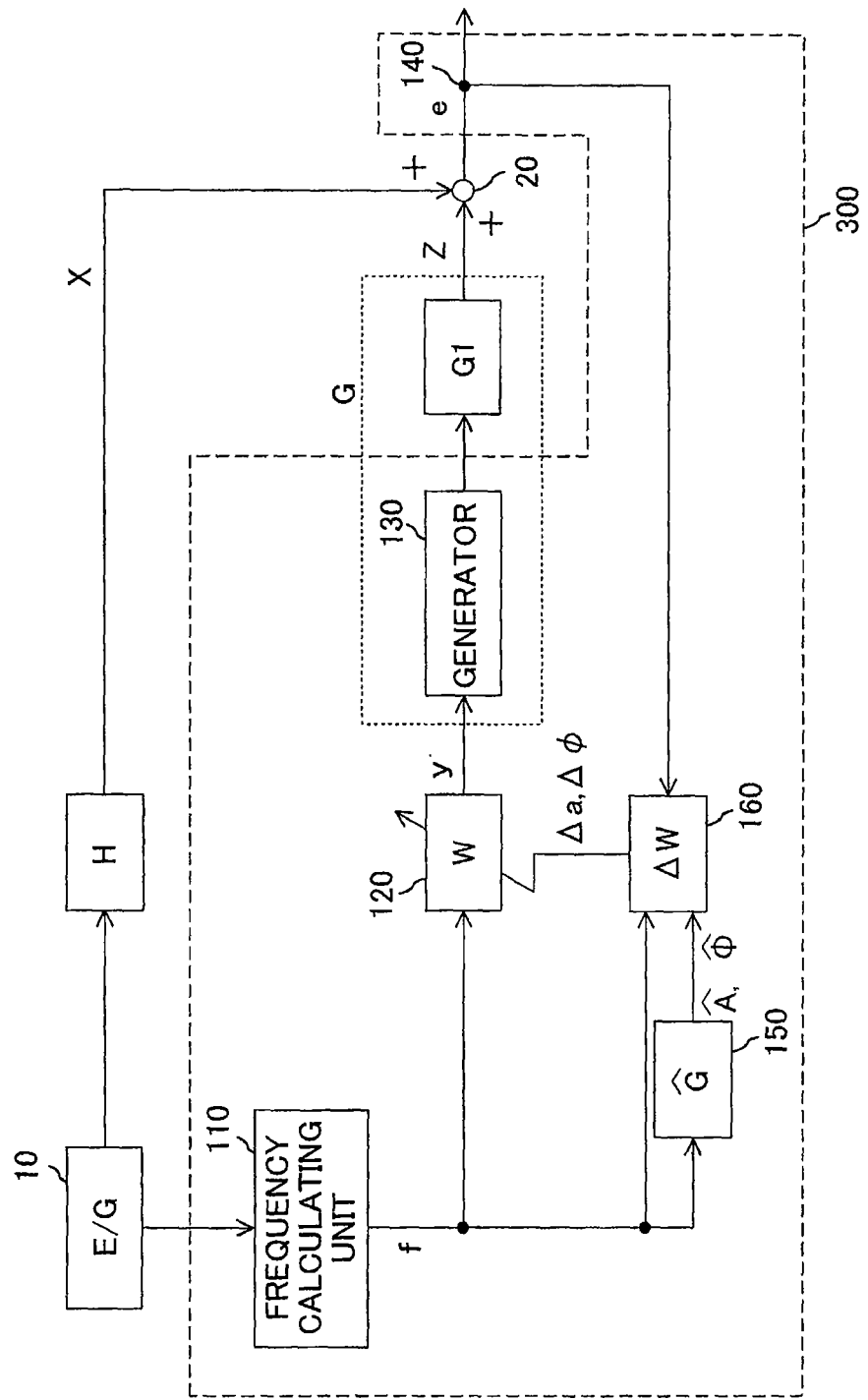
FIG. 7 is a control block diagram showing an active vibration or noise suppression system in Example 5.

As shown in FIG. 7, the system 300 of the present example is different from the system 100 of Example 4 (shown in FIG. 1) in having no parameter setting unit 170. That is to say, although the parameter setting unit 170 sets the initial values $a_{(0)}$, $\phi_{(0)}$ in the system 100 of Example 4, the initial values $a_{(0)}$, $\phi_{(0)}$ are set to 0 in the system 300 of the present example. Other constituent components are the same as those of Example 4.

Analysis

Figure 8A:
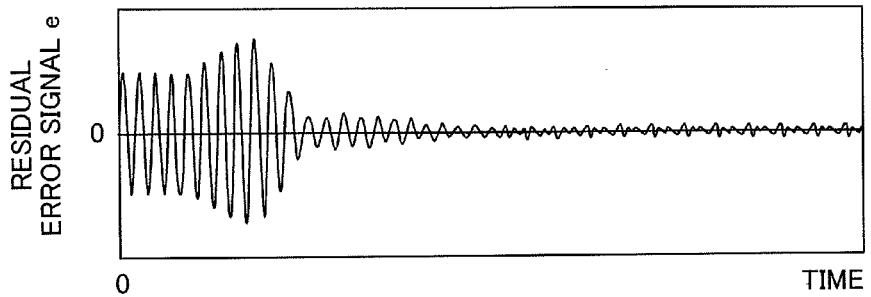
FIG. 8A shows a residual error signal in an analysis result when a phase component $\Phi_G$ of a first transfer function G and a phase component $\Phi h_G$ of a first estimated transfer function Gh have a phase difference of 150° in Example 5.
Figure 8B:
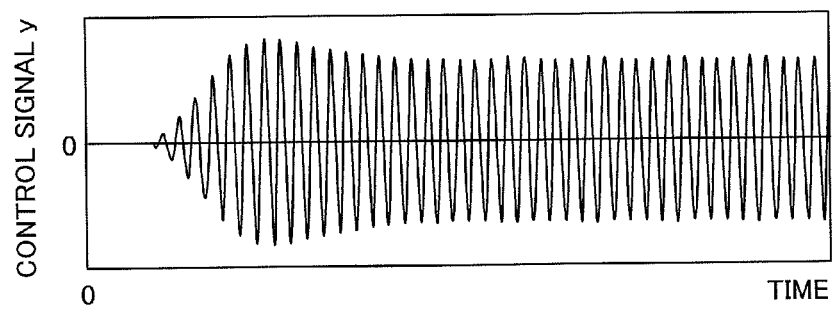
FIG. 8B shows a sine wave control signal in the above analysis result.
Figure 8C:
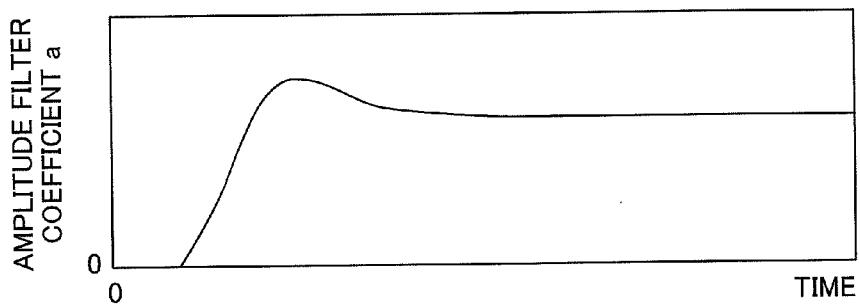
FIG. 8C shows an amplitude filter coefficient in the above analysis result.
Figure 8D:
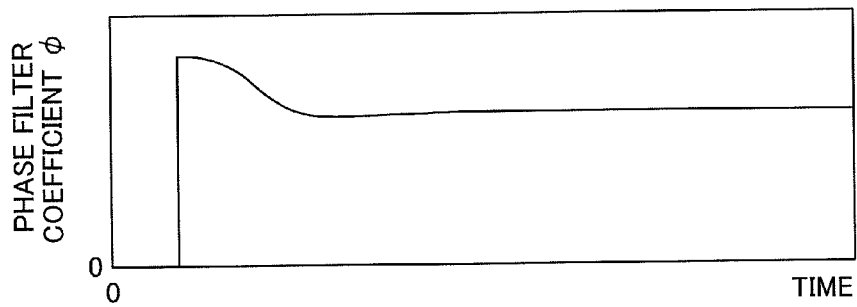
FIG. 8D shows a phase filter coefficient in the above analysis result.

An analysis was performed on the present example when the phase component $\Phi_G$ of the first transfer function G and the phase component $\Phi h_G$ of the first estimated transfer function Gh had a phase difference of 150°. The analysis result is shown in FIGS. 8A to 8D. It is apparent from FIG. 8A that the residual error signal e has converged. The sine wave control signal y at that time is shown in FIG. 8B. FIGS. 8C and 8D indicate that the amplitude filter coefficient a and the phase filter coefficient $\phi$ have respectively converged.

Even when the phase difference is 150°, eventually control can be thus converged without being diverged. Therefore, even when the phase component of the first transfer function G and the phase component of the first estimated transfer function Gh are differentiated from each other by a change of the first transfer function G caused by temperature or passage of time, control can be converged. Moreover, when the first estimated transfer function Gh is highly precise, the use of the first estimated transfer function Gh realizes fast convergence.

Example 6

An active vibration or noise suppression system 400 of the present example will be described with reference to FIG. 9. In Example 5, the estimate value Gh of the first transfer function G is used in the expression for updating the adaptive filter coefficient W. In contrast, the system 400 of the present example does not use the estimate value Gh of the first transfer function G in the expression for updating the adaptive filter coefficient W.

Figure 9:
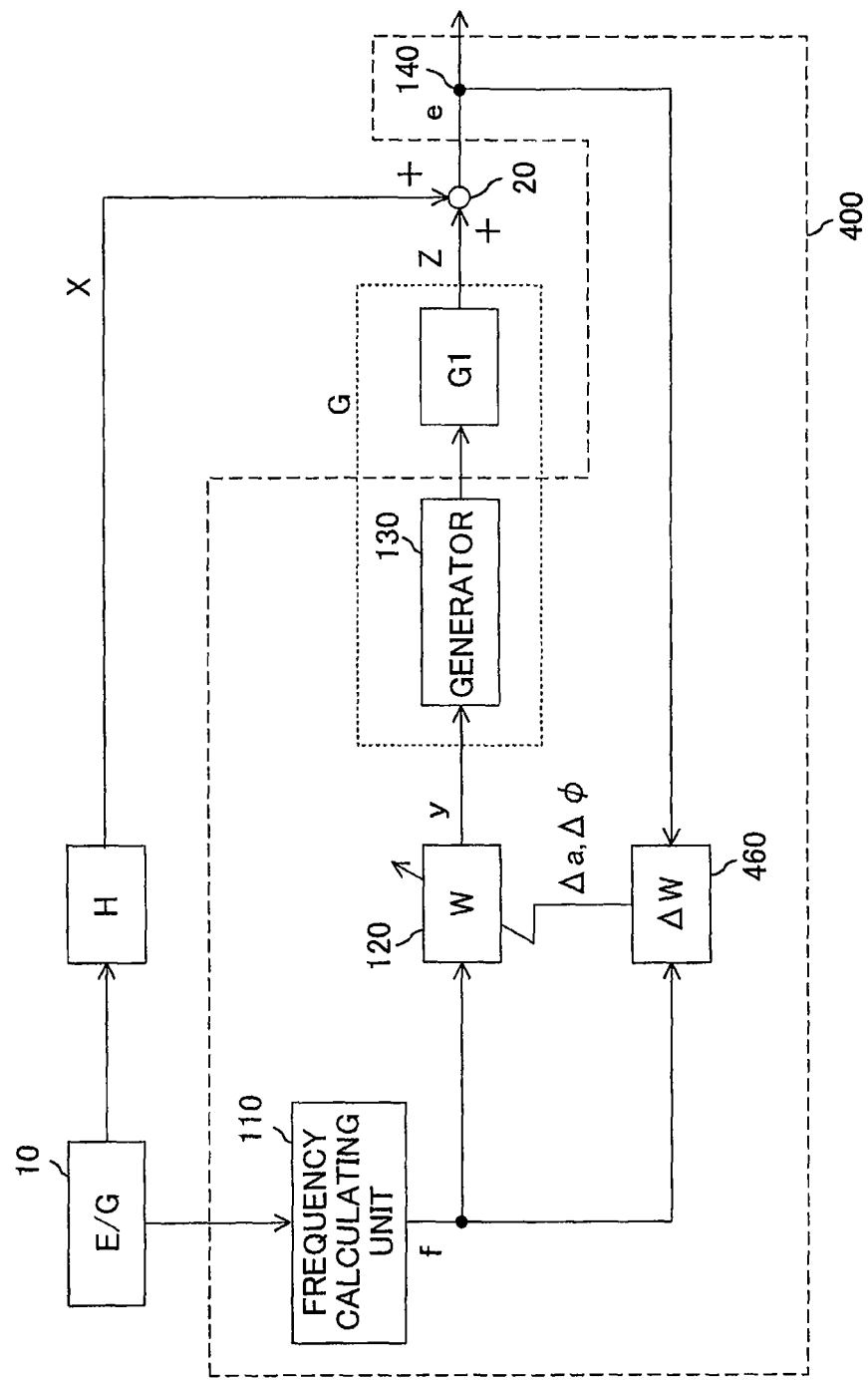
FIG. 9 is a control block diagram showing an active vibration or noise suppression system in Example 6.

That is to say, as shown in FIG. 9, this system 400 comprises a frequency calculating unit 110, a control signal generating unit 120, a generator 130, a residual error signal detecting unit 140, and an adaptive filter coefficient updating unit 460. The same constituent components as those of Example 1 are assigned with the same reference numerals and their description will be omitted here. That is to say, the system 400 of the present example is different from the system 300 of Example 5 in having no Gh data setting unit 150 shown in FIG. 7 and having an adaptive filter coefficient updating unit 460.

In this adaptive filter coefficient updating unit 460 substantially as well as the adaptive filter coefficient updating unit 260 of Example 2, the amplitude update term $\Delta a_{(n+1)}$ is expressed by Equation (57) and the phase update term $\Delta\phi_{(n+1)}$ is expressed by Equation (58). Thus, the amplitude update term $\Delta a_{(n+1)}$ and the phase update term $\Delta\phi_{(n+1)}$ are update terms which are independent of the first estimated transfer function Gh.

Here, even if the phase filter coefficient $\phi_{(n)}$ is selected from the full range of 360°, control can be converged as in Example 5. Therefore, even if the phase component $\Phi h_G$ of the first estimated transfer function Gh is not used in the phase component of the periodic functions (the sine function or the cosine function) in Equations (30), (31), it does not happen that control diverges depending on the value of the phase filter coefficient $\phi_{(n)}$. Therefore, even if the update expressions do not use the phase component $\Phi h_c$ as in Equations (57), (58), control can be converged.

Moreover, when the amplitude component $Ah_G$ of the first estimated transfer function Gh is not used in Equations (57), (58), there is a risk that the performance to follow amplitude may degrade, when compared to when the update expressions using the amplitude component $Ah_G$ are used. Therefore, the time to reach convergence may increase. This, however, does not cause divergence of control.

Even if the adaptive filter coefficient W is thus updated without using the first estimated transfer function Gh as in the present example, control can be converged as reliably as in Example 5. Moreover, because the first estimated transfer function Gh is not used, there is no need to perform processing for identifying the first transfer function G and there is no need to pursue accuracy in identification. Therefore, arithmetic processing can be simplified and load of arithmetic processing can be reduced.

Example 7

Further added to Example 6 above are conditions that the amplitude filter coefficient $a_{(n)}$ is a positive number and that the initial value $\phi_{(0)}$ of the phase filter coefficient is set within a range which satisfies Inequality (62). Upon setting these conditions, control can be suppressed from being diverged and can be converged quickly. The reason why the abovementioned advantageous effect is exhibited will be described below.

An averaging method is applied to the amplitude update term $\Delta a_{(n+1)}$ and the phase update term $\Delta \phi_{(n+1)}$. That is to say, the amplitude filter coefficient $a_{(n)}$ and the phase filter coefficient $\phi_{(n)}$ for one cycle (0 to T) are subjected to averaging processing by using the averaging method. Relational expressions of the respective filter coefficient update terms $\Delta a_{(n+1)}$ and $\Delta \phi_{(n+1)}$ are derived by using the respective averaged filter coefficients $a_{(n)}$, $\phi_{(n)}$ for one cycle. One or more solutions (a, $\phi$) of the respective filter coefficients $a_{(n)}$, $\phi_{(n)}$ when the derived relational expressions of the respective filter coefficient update terms $\Delta a_{(n+1)}$, $\Delta \phi_{(n+1)}$ are 0. The one or more solutions (a, $\phi$) correspond to one or more equilibrium points of the respective filter coefficient update terms $\Delta a_{(n+1)}$, $\Delta \phi_{(n+1)}$. Generally, a plurality of equilibrium points (a, $\phi$) are obtained. In the present example, some of the equilibrium points have a plurality of $\phi$ when a is a positive number and a plurality of $\phi$ when a is a negative number.

Then stability analysis is performed on the respective plurality of equilibrium points (a, $\phi$). Then one or more equilibrium points (a, $\phi$) at which control is stable are obtained. The plurality of equilibrium points (a, $\phi$) contain one or more equilibrium points (a, $\phi$) at which control is unstable. Whether control is stable or unstable is determined by whether the respective coefficients of the characteristic equation have the same sign or not. That is to say, when the coefficients of the characteristic equation have the same sign, it is determined that control is stable. Here, when a is a positive number, satisfying cos $\phi$<0 is a necessary condition for satisfying the stability condition. On the other hand, when a is a negative number, there is no $\phi$ which satisfies the stability condition. In addition, when a is a positive number, $\phi$ which can satisfy cos $\phi$<0 is within a range which satisfies Inequality (62).

[Math. 62]

$$\frac{4k+1}{2}\pi < \phi_{(0)} < \frac{4k+3}{2}\pi \quad (62)$$

wherein k: integer

It is particularly preferred that the initial value $\phi_{(0)}$ of the phase filter coefficient is set to Equation (63). That is to say, the initial value $\phi_{(0)}$ of the phase filter coefficient is set to a phase at a center of a control stability region, i.e., a phase which is at the most distant from stability limits. This facilitates the phase filter coefficient $\phi_{(n)}$ to be moved within a stability region when updated. That is to say, upon keeping the phase filter coefficient $\phi_{(n)}$ in the stable state, faster convergence can be achieved.

[Math. 63]

$$\phi_{(0)}=(2k+1)\pi \quad (63)$$

Others

In the above example, the amplitude update term $\Delta a_{(n+1)}$ and the phase update term $\Delta \phi_{(n+1)}$ are expressed by update expressions shown in Equations (32), (33), and Equations (57), (58). In addition to these, the amplitude update term $\Delta a_{(n+1)}$ and the phase update term $\Delta \phi_{(n+1)}$ can be expressions obtained by adding or subtracting other terms to or from the terms shown in Equations (32), (33) or Equations (57), (58) in order to enhance convergence stability. That is to say, by expressing the amplitude update term $\Delta a_{(n+1)}$ and the phase update term $\Delta \phi_{(n+1)}$ by update expressions containing at least the terms shown in Equations (32), (33), or Equations (57), (58), the above mentioned advantageous effects can be exhibited.

REFERENCE SIGNS LIST

10: source of vibration or noise (engine), 20: evaluation point, 100, 200, 300, 400: active vibration or noise suppression system, 110: frequency calculating unit, 120: control signal generating unit, 130: generator, 140: residual error signal detecting unit, 150: first estimated transfer function setting unit, 160, 260, 460: adaptive filter coefficient updating unit, 170, 270: parameter setting unit, 180: torque variation amount calculating unit

What is claimed is:

1. An active vibration or noise suppression system is applied to a vehicle for actively suppressing vibration or noise at an evaluation point by outputting control vibration or control sound, comprising:
   an active vibration or noise suppression circuit that generates a sine wave control signal $y_{(n)}$ constituted by frequency of a vibration or noise source, and an amplitude filter coefficient $a_{(n)}$ and a phase filter coefficient $\phi_{(n)}$ as an adaptive filter coefficient;
   outputs the control vibration or control sound corresponding to the sine wave control signal $y_{(n)}$;
   detects, at the evaluation point, a residual error signal $e_{(n)}$ generated by interference between vibration or noise caused by the vibration or noise source and the control vibration or control sound;
   calculates an amplitude update term $\Delta a_{(n+1)}$ to be added to or subtracted from a last updated value of the amplitude filter coefficient $a_{(n)}$ for update, so as to reduce the residual error signal $e_{(n)}$; and
   calculates a phase update term $\Delta \phi_{(n+1)}$ to be added to or subtracted from a last updated value of the phase filter coefficient $\phi_{(n)}$ for update, so as to reduce the residual error signal $e_{(n)}$,
   the sine wave control signal $y_{(n)}$ is expressed by a sine wave having an amplitude component and a phase component,
   each of the amplitude update term $\Delta a_{(n+1)}$ and the phase update term $\Delta \phi_{(n+1)}$ contains a sine wave or cosine wave term having an amplitude component and a phase component, and the phase component of the sine wave control signal $y_{(n)}$ is expressed by multiplying a coefficient other than 1 by the phase filter coefficient $\phi_{(n)}$, or the phase component of the sine wave or cosine wave term of each of the amplitude update term $\Delta a_{(n+1)}$ and the phase update term $\Delta \phi_{(n+1)}$ is expressed by multiplying a coefficient other than 1 by the phase filter coefficient $\phi_{(n)}$, wherein the active vibration or noise suppression circuit improves convergence, wherein the phase component of the sine wave control signal $y_{(n)}$ is expressed by multiplying a value greater than 1 by the phase filter coefficient $\phi_{(n)}$, and wherein the sine wave control signal $y_{(n)}$ is expressed by Equation (1);

[Equation 1]

$$y_{(n)} = a_{(n)} \cdot \sin(\omega \cdot t_{(n)} + q \cdot \phi_{(n)}) \tag{1}$$

wherein:
- $y_{(n)}$: sine wave control signal
- $a_{(n)}$: amplitude filter coefficient
- $\phi_{(n)}$: phase filter coefficient
- $\omega$: angular frequency
- $q$: phase multiplier coefficient ($q > 1$)
- $t_{(n)}$: sampling time
- $(n)$: the number of samples (time step).

2. The active vibration or noise suppression system according to claim 1, wherein:
the sine wave or cosine wave term of the amplitude update term $\Delta a_{(n+1)}$ is a term in Expression (2); and
the sine wave or cosine wave term of the phase update term $\Delta \phi_{(n+1)}$ is a term in Expression (3);

[Expression 2]

$$a1 \cdot e_{(n)} \cdot \sin\left(\omega \cdot t_{(n)} + \frac{\phi_{(n)}}{m} + \phi 1\right) \tag{2}$$

wherein:
- $e_{(n)}$: residual error signal
- $a1$: amplitude coefficient
- $\phi 1$: phase coefficient
- $m$: stability coefficient ($m \geq 1$)

[Expression 3]

$$a2 \cdot e_{(n)} \cdot \cos\left(\omega \cdot t_{(n)} + \frac{\phi_{(n)}}{m} + \phi 2\right) \tag{3}$$

wherein:
- $a2$: amplitude coefficient
- $\phi 2$: phase coefficient.

3. The active vibration or noise suppression system according to claim 2,
wherein the amplitude coefficient $a1$ and the phase coefficient $\phi 1$ in Expression (2) and the amplitude coefficient $a2$ and the phase coefficient $\phi 2$ in Expression (3) are coefficients which are independent of a transfer function between the control signal generator and the evaluation point.

4. The active noise vibration or noise suppression system according to claim 3, wherein:
Expression (2) is replaced by Expression (4); and
Expression (3) is replaced by Expression (5);

[Expression 4]

$$\mu_{a2} \cdot e_{(n)} \cdot \sin\left(\omega \cdot t_{(n)} + \frac{\phi_{(n)}}{m}\right) \tag{4}$$

wherein $\mu_{a2}$: step size parameter

[Expression 5]

$$\mu_{\phi 2} \cdot e_{(n)} \cdot \cos\left(\omega \cdot t_{(n)} + \frac{\phi_{(n)}}{m}\right) \tag{5}$$

wherein $\mu_{\phi 2}$: step size parameter.

5. The active vibration or noise suppression system according to claim 2, wherein:
the active vibration or noise suppression system further comprises an estimated transfer function storage for storing an estimate value of a transfer function between the control signal generator and the evaluation point beforehand; and
at least one of the amplitude coefficient $a1$ and the phase coefficient $\phi 1$ in Expression (2), and at least one of the amplitude coefficient $a2$ and the phase coefficient $\phi 2$ in Expression (3) are coefficients obtained based on the estimate value of the transfer function.

6. The active vibration or noise suppression system according to claim 5, wherein:
Expression (2) is replaced by Expression (6); and
Expression (3) is replaced by Expression (7);

[Expression 6]

$$\frac{\mu_{a1} \cdot e_{(n)} \cdot \sin\left(\omega \cdot t_{(n)} + \frac{\phi_{(n)}}{m} + \frac{\hat{\Phi}}{p}\right)}{\hat{A}} \tag{6}$$

wherein:
- $\mu_{a1}$: step size parameter
- $\hat{A}$: amplitude component of the estimate value of the transfer function
- $\hat{\phi}$ phase component of the estimate value of the transfer function
- $p$: coefficient

[Expression 7]

$$\mu_{\phi 1} \cdot e_{(n)} \cdot \cos\left(\omega \cdot t_{(n)} + \frac{\phi_{(n)}}{m} + \frac{\hat{\Phi}}{p}\right) \tag{7}$$

wherein $\mu_{\phi 1}$: step size parameter.

7. The active vibration or noise suppression system according to claim 2, wherein:
the stability coefficient $m$ is set to a value greater than 1; and
the phase multiplier coefficient $q$ is set to a value greater than the stability coefficient $m$.

8. An active vibration or noise suppression system is applied to a vehicle for actively suppressing vibration or noise at an evaluation point by outputting control vibration or control sound, comprising:

an active vibration or noise suppression circuit that
generates a sine wave control signal $y_{(n)}$ constituted by frequency of a vibration or noise source, and an amplitude filter coefficient $a_{(n)}$ and a phase filter coefficient 100 $_{(n)}$ as an adaptive filter coefficient;
outputs the control vibration or control sound corresponding to the sine wave control signal $y_{(n)}$;
detects, at the evaluation point, a residual error signal $e_{(n)}$ generated by interference between vibration or noise caused by the vibration or noise source and the control vibration or control sound;
calculates an amplitude update term $\Delta a_{(n)}$ to be added to or subtracted from a last updated value of the amplitude filter coefficient $a_{(n)}$ for update, so as to reduce the residual error signal $e_{(n)}$; and
calculates a phase update term $\Delta\phi_{(n)}$ to be added to or subtracted from a last updated value of the phase filter coefficient $\phi_{(n)}$ for update, so as to reduce the residual error signal $e_{(n)}$,
the sine wave control signal $y_{(n)}$ is expressed by a sine wave having an amplitude component and a phase component,
each of the amplitude update term $\Delta a_{(n+1)}$ and the phase update term $\Delta\phi_{(n+1)}$ contains a sine wave or cosine wave term having an amplitude component and a phase component, and
the phase component of the sine wave control signal $y_{(n)}$ is expressed by multiplying a coefficient other than 1 by the phase filter coefficient $\phi_{(n)}$, or the phase component of the sine wave or cosine wave term of each of the amplitude update term $\phi a_{(n+1)}$ and the phase update term $\phi\Delta_{(n+1)}$ is expressed by multiplying a coefficient other than 1 by the phase filter coefficient $\phi_{(n)}$,
wherein the active vibration or noise suppression circuit improves convergence,
wherein when the sine wave control signal $y_{(n)}$ is expressed by Equation (8),
the sine wave or cosine wave term of the amplitude update term $\Delta a_{(n+1)}$ contains a sine wave term in Expression (9); and
the sine wave or cosine wave term of the phase update term $\Delta a_{(n+1)}$ contains a cosine wave term in Expression (10);

[Equation 8]

$$y_{(n)} = a_{(n)} \cdot \sin(\omega \cdot t_{(n)} + \phi_{(n)}) \quad (8)$$

wherein:
$y_{(n)}$ sine wave control signal
$a_{(n)}$: amplitude filter coefficient
$\phi_{(n)}$: phase filter coefficient
$\omega$: angular frequency
$t_{(n)}$: sampling time
(n): the number of samples (time step)

[Expression 9]

$$a1 \cdot e_{(n)} \cdot \sin\left(\omega \cdot t_{(n)} + \frac{\phi_{(n)}}{m} + \phi1\right) \quad (9)$$

wherein:
$e_{(n)}$: residual error signal
a1: amplitude coefficient
$\phi$1: phase coefficient
m: stability coefficient (m >1)

[Expression 10]

$$a2 \cdot e_{(n)} \cdot \cos\left(\omega \cdot t_{(n)} + \frac{\phi_{(n)}}{m} + \phi2\right) \quad (10)$$

wherein:
a2: amplitude coefficient
$\phi$2: phase coefficient.

9. The active vibration or noise suppression system according to claim 8,
wherein the amplitude coefficient a1 and the phase coefficient $\phi$1 in Expression (9) and the amplitude coefficient a2 and the phase coefficient $\phi$2 in Expression (10) are coefficients which are independent of a transfer function between the control signal generator and the evaluation point.

10. The active vibration or noise suppression system according to claim 9, wherein:
Expression (9) is replaced by Expression (11); and
Expression (10) is replaced by Expression (12);

[Expression 11]

$$\mu_{a2} \cdot e_{(n)} \cdot \sin\left(\omega \cdot t_{(n)} + \frac{\phi_{(n)}}{m}\right) \quad (11)$$

wherein $\mu_{a2}$: step size parameter

[Expression 12]

$$\mu_{\phi2} \cdot e_{(n)} \cdot \cos\left(\omega \cdot t_{(n)} + \frac{\phi_{(n)}}{m}\right) \quad (12)$$

wherein $\mu_{\phi2}$: step size parameter.

11. The active vibration or noise suppression system according to claim 8, wherein:
the active vibration or noise suppression system further comprises an estimated transfer function storage for storing an estimate value of a transfer function between the control signal generator and the evaluation point beforehand, and
at least one of the amplitude coefficient a1 and the phase coefficient $\phi$1 in Expression (9), and at least one of the amplitude coefficient a2 and the phase coefficient $\phi$2 in Expression (10) are coefficients obtained based on the estimate value of the transfer function.

12. The active vibration or noise suppression system according to claim 11, wherein:
Expression (9) is replaced by Expression (13), and
Expression (10) is replaced by Expression (14);

[Expression 13]

$$\frac{\mu_{a1} \cdot e_{(n)} \cdot \sin\left(\omega \cdot t_{(n)} + \frac{\phi_{(n)}}{m} + \frac{\hat{\Phi}}{p}\right)}{\hat{A}} \quad (13)$$

wherein:
$\mu_{a1}$: step size parameter
$\hat{A}$: amplitude component of the estimate value of the transfer function $\hat{\phi}$ phase component of the estimate value of the transfer function p: coefficient

[Expression 14]

$$\mu_{\phi 1} \cdot e_{(n)} \cdot \cos\left(\omega \cdot t_{(n)} + \frac{\phi_{(n)}}{m} + \frac{\hat{\Phi}}{p}\right) \quad (14)$$

wherein $\mu_{\phi 1}$: step size parameter.

13. The active vibration or noise suppression system according to claim 1,
wherein an initial value $\phi_{(0)}$ of the phase filter coefficient is set based on a value $\phi_{(last)}$ of the phase filter coefficient at a time of last convergence.

14. The active vibration or noise suppression system according to claim 13,
wherein the initial value $\phi_{(0)}$ of the phase filter coefficient is the value $\phi_{(last)}$ of the phase filter coefficient at the time of last convergence.

15. The active vibration or noise suppression system according to claim 13,
wherein the initial value $\phi_{(0)}$ of the phase filter coefficient is set based on the value $\phi_{(last)}$ of the phase filter coefficient at the time of last convergence, frequency f at the time of last convergence, and frequency f at a present time.

16. The active vibration or noise suppression system according to claim 13,
wherein an initial value $a_{(0)}$ of the amplitude filter coefficient is set based on frequency f at a present time.

17. The active vibration or noise suppression system according to claim 13,
wherein a step size parameter of the amplitude update term $\omega a_{(n+1)}$ is set based on a value $a_{(last)}$ of the amplitude filter coefficient at the time of last convergence.

18. The active vibration or noise suppression system according to claim 17, wherein:
the active vibration or noise suppression system is applied to a vehicle having an engine; and
the step size parameter of the amplitude update term $\omega a_{(n+1)}$ is set to a value which is proportional to a value obtained by dividing the value $a_{(last)}$ of the amplitude filter coefficient at the time of last convergence by a value $trq_{(last)}$ of a driving torque variation amount of the engine at the time of last convergence.

19. The active vibration or noise suppression system according to claim 1,
wherein an initial value $\phi_{(0)}$ of the phase filter coefficient is set within a range which satisfies Inequality (15);

[Math. 15]

$$\frac{4k+1}{2}\pi < \phi_{(0)} < \frac{4k+3}{2}\pi \quad (15)$$

wherein: k: integer.

20. The active vibration or noise suppression system according to claim 1, wherein the amplitude filter coefficient is a positive number.

21. An active vibration or noise suppression system for actively suppressing vibration or noise at an evaluation point by outputting control vibration or control sound, comprising:
an active vibration or noise suppression circuit that generates a sine wave control signal $y_{(n)}$ constituted by frequency of a vibration or noise source, and an amplitude filter coefficient $a_{(n)}$ and a phase filter coefficient $\phi_{(n)}$ as an adaptive filter coefficient;
outputs the control signal or control sound corresponding to the sine wave control signal $y_{(n)}$;
detects a residual error signal $e_{(n)}$ generated by interference between vibration or noise caused by the vibration or noise source and the control vibration or control sound at the evaluation point;
calculates an amplitude update term $\Delta a_{(n+1)}$ to be added to or subtracted from a last updated value of the amplitude filter coefficient $a_{(n)}$ for update, so as to reduce the residual error signal $e_{(n)}$; and
calculates a phase update term $\Delta\phi_{(n+1)}$ to be added to or subtracted from a last updated value of the phase filter coefficient $\phi_{(n)}$ for update, so as to reduce the residual error signal $e_{(n)}$; and
an initial value $\phi_{(0)}$ of the phase filter coefficient is set based on a value $\phi_{(last)}$ of the phase filter coefficient at a time of last convergence,
wherein the active vibration or noise suppression system is applied to a vehicle having an engine,
wherein the active vibration or noise suppression circuit improves convergence, and
wherein a step size parameter of the amplitude update term $\Delta a_{(n+1)}$ is set to a value which is proportional to a value obtained by dividing the value $a_{(last)}$ of the amplitude filter coefficient at the time of last convergence by a value $trq_{(last)}$ of a driving torque variation amount of the engine at the time of last convergence.

* * * * *